US010194051B2

United States Patent
Kawano et al.

(10) Patent No.: US 10,194,051 B2
(45) Date of Patent: Jan. 29, 2019

(54) DEVICE FOR DETECTING AMOUNT OF SKEW IN DOCUMENT AND IMAGE PROCESSING APPARATUS

(71) Applicant: Konica Minolta, Inc., Chiyoda-ku, Tokyo (JP)

(72) Inventors: Takuya Kawano, Toyokawa (JP); Kenya Haba, Toyokawa (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 126 days.

(21) Appl. No.: 15/373,157

(22) Filed: Dec. 8, 2016

(65) Prior Publication Data

US 2017/0171428 A1    Jun. 15, 2017

(30) Foreign Application Priority Data

Dec. 9, 2015 (JP) ................................ 2015-239885

(51) Int. Cl.
*H04N 1/00* (2006.01)
*H04N 1/387* (2006.01)

(52) U.S. Cl.
CPC ....... *H04N 1/3878* (2013.01); *H04N 1/00718* (2013.01); *H04N 1/00737* (2013.01); *H04N 1/00748* (2013.01); *H04N 1/00795* (2013.01); *H04N 2201/0094* (2013.01)

(58) Field of Classification Search
CPC .................................................. H04N 1/3878
See application file for complete search history.

(56) References Cited

U.S. PATENT DOCUMENTS

| 6,271,935 | B1 | 8/2001 | Cook | |
|---|---|---|---|---|
| 2002/0001094 | A1* | 1/2002 | Yoshida | G03G 15/5025 358/1.9 |
| 2003/0006550 | A1* | 1/2003 | Chujo | B65H 7/125 271/262 |

(Continued)

FOREIGN PATENT DOCUMENTS

| CN | 101378445 | 3/2009 |
|---|---|---|
| CN | 101420507 | 4/2009 |

(Continued)

OTHER PUBLICATIONS

First Office Action issued in corresponding Chinese Patent Application No. 201611121275.6, dated Jul. 19, 2018, with English Translation (7 pages).

*Primary Examiner* — Benjamin O Dulaney
(74) *Attorney, Agent, or Firm* — Buchanan Ingersoll & Rooney PC

(57) ABSTRACT

A device for detecting an amount of skew in a document placed on a plate is provided. The device includes: a scanner for scanning an area including an edge of the document; a detector for detecting a boundary point between the document and the plate; a portion for setting a boundary point group of interest including boundary points; a portion for setting a midpoint of an oblique line for approximating the edge of the document; a portion for setting, as the oblique line, a line which passes through the midpoint and slants to the main scanning direction; a portion for modifying an amount of skew of the oblique line; and a portion for determining that an amount of skew in the document is an amount of skew of the oblique line having the error equal to a threshold or smaller.

20 Claims, 28 Drawing Sheets

(56) References Cited

U.S. PATENT DOCUMENTS

| | | |
|---|---|---|
| 2006/0039628 A1 | 2/2006 | Li et al. |
| 2009/0060344 A1* | 3/2009 | Yamazaki .......... G06K 9/00248 |
| | | 382/195 |
| 2009/0109502 A1* | 4/2009 | Minamino ........... H04N 1/3878 |
| | | 358/488 |
| 2013/0182002 A1* | 7/2013 | Macciola ............... H04N 1/387 |
| | | 345/589 |
| 2013/0182296 A1 | 7/2013 | Masaki et al. |
| 2014/0132966 A1 | 5/2014 | Masaki et al. |
| 2015/0009520 A1* | 1/2015 | Yamada ................. H04N 1/387 |
| | | 358/1.14 |
| 2017/0126929 A1* | 5/2017 | Noro .................... H04N 1/3878 |
| 2017/0155796 A1* | 6/2017 | Watanabe .......... H04N 1/00748 |

FOREIGN PATENT DOCUMENTS

| | | |
|---|---|---|
| CN | 104284053 | 1/2015 |
| JP | 2002-199179 A | 7/2002 |
| JP | 2003-259089 A | 9/2003 |
| JP | 2003-259090 A | 9/2003 |
| JP | 2003-319160 A | 11/2003 |
| JP | 2009-042814 A | 2/2009 |
| JP | 2013-146034 A | 7/2013 |
| JP | 2015-015687 A | 1/2015 |

* cited by examiner

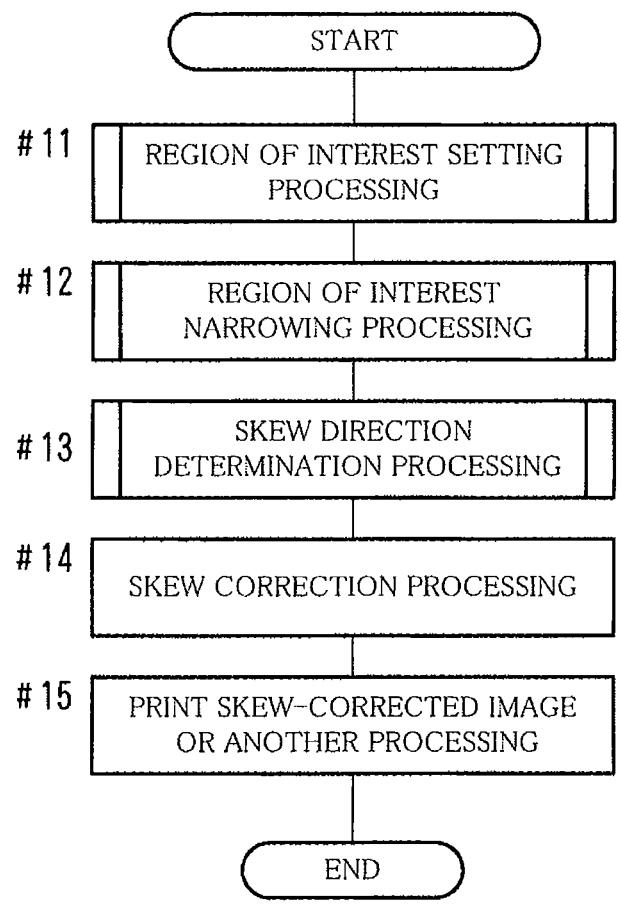

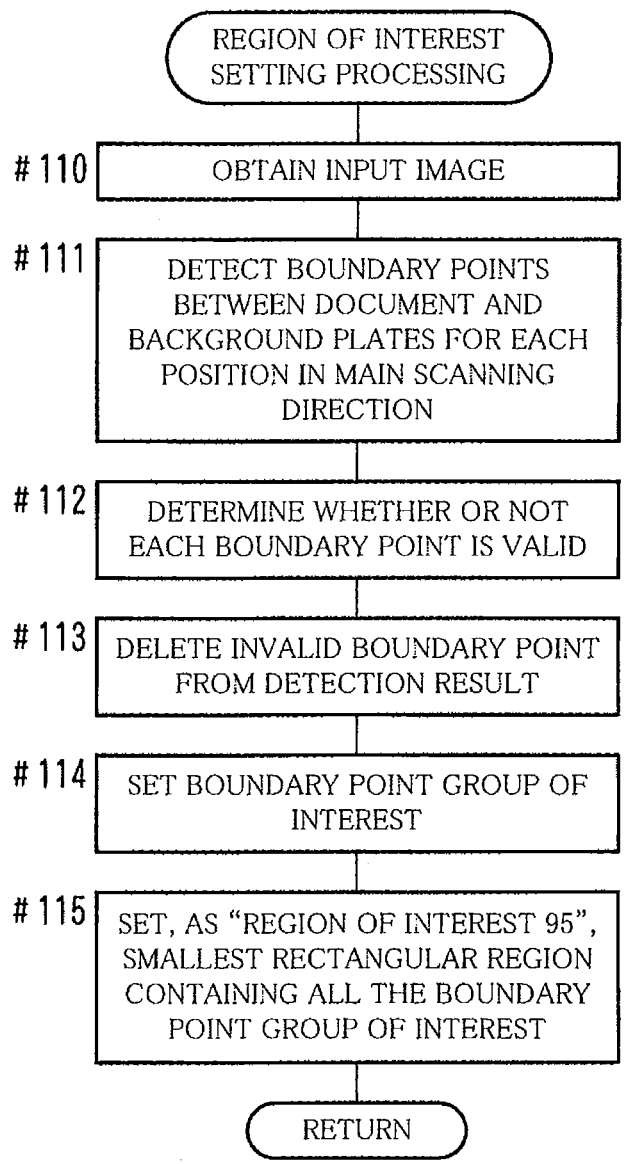

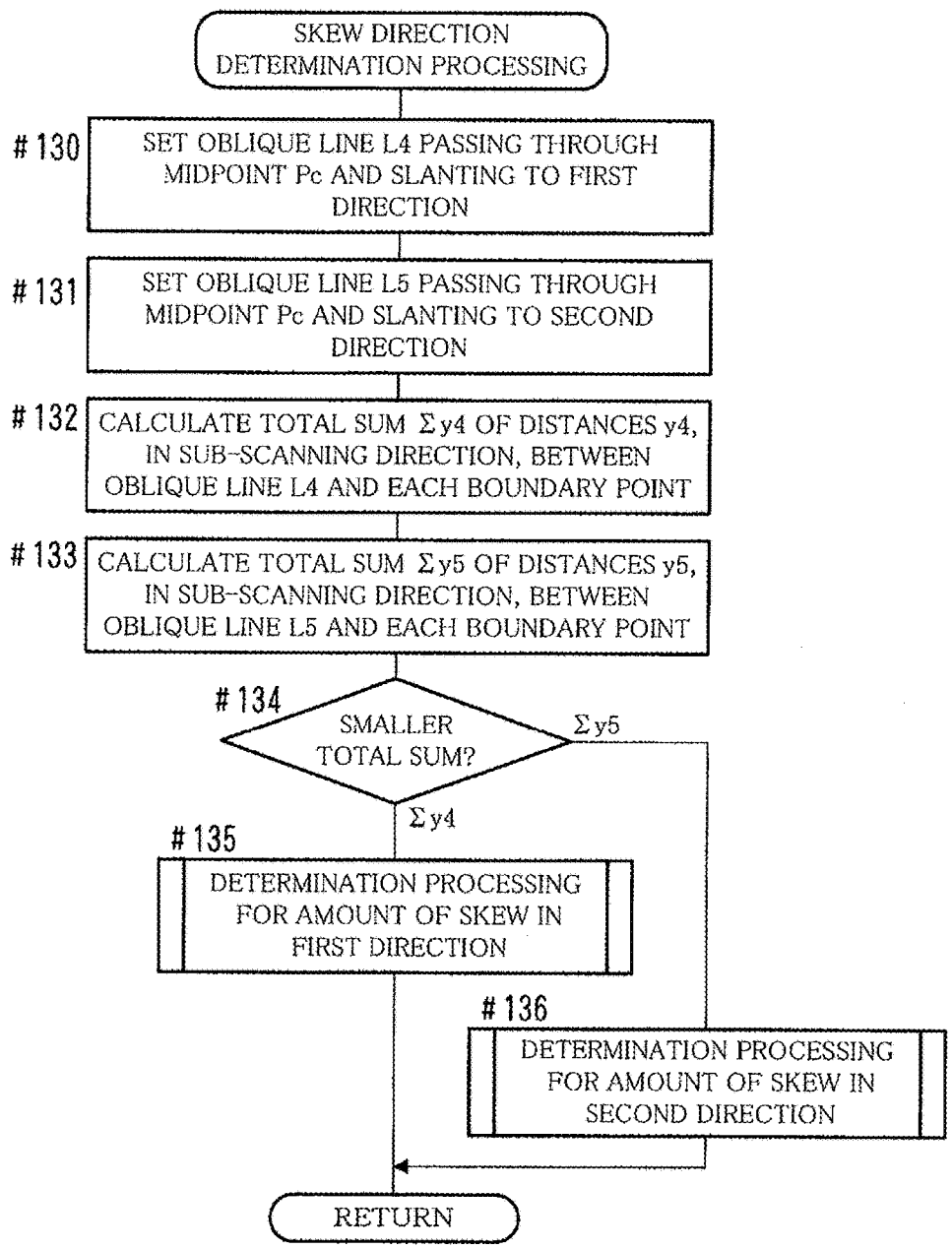

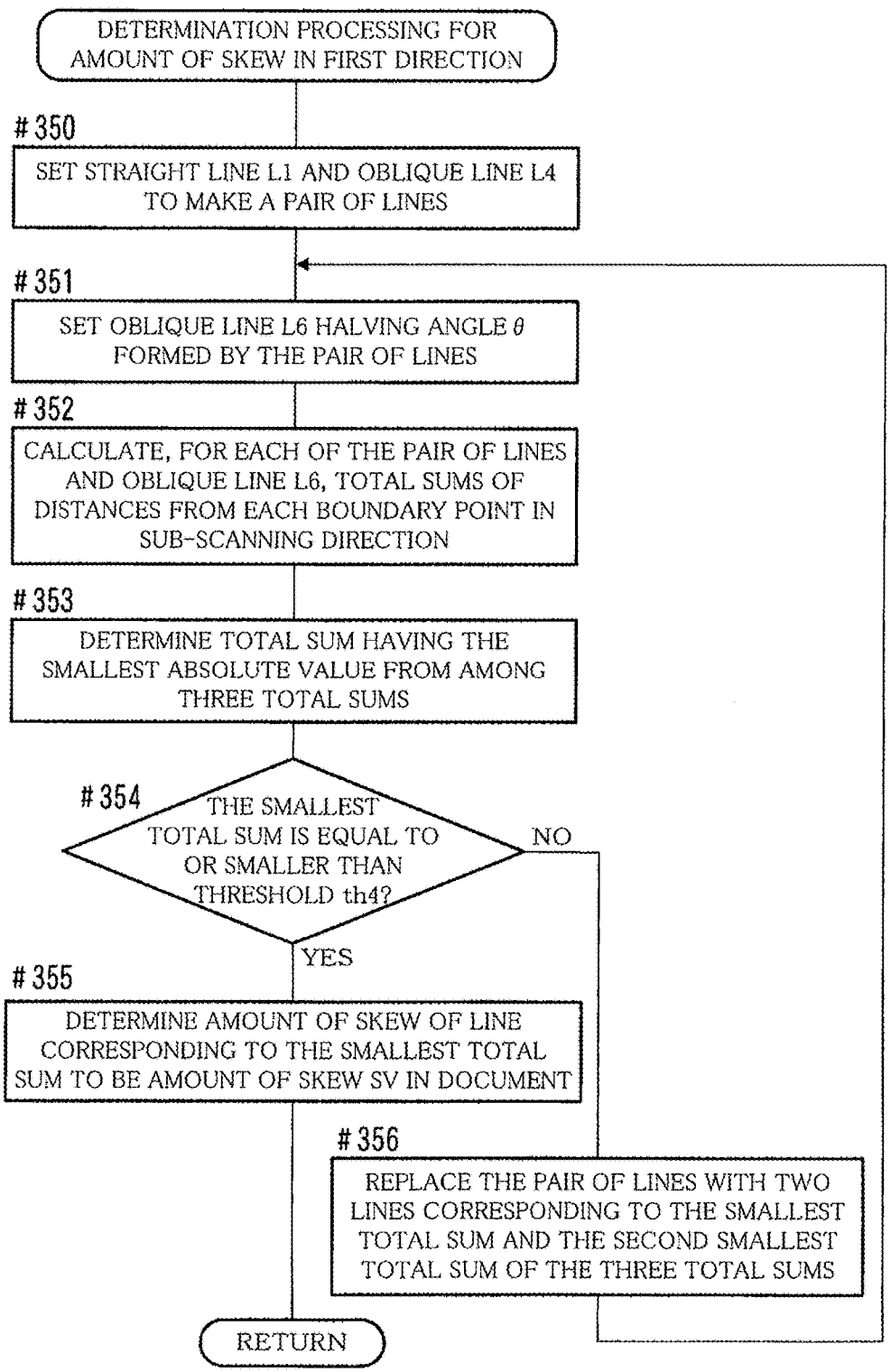

DEVICE FOR DETECTING AMOUNT OF SKEW IN DOCUMENT AND IMAGE PROCESSING APPARATUS

The present U.S. patent application claims a priority under the Paris Convention of Japanese patent application No. 2015-239885 filed on Dec. 9, 2015, the entirety of which is incorporated herein by reference.

BACKGROUND OF THE INVENTION

1. Field of the Invention

The present invention relates to a device for detecting an amount of skew in a document sheet.

2. Description of the Related Art

Image processing apparatuses for apply processing after reading an image depicted on a document have been provided with an automatic document feeder. Examples of such an image processing apparatus include a copier and a multi-functional peripheral (MFP: multifunction device or combination machine). The automatic document feeder is operable to automatically feed document sheets placed thereon, one by one, to a scan position.

Depending on what a document is like or how the document is placed on the automatic document feeder, the document fed by the automatic document feeder is sometimes skewed (tilted). An example of well-known methods for correcting skew in a document is a method of bringing the document into contact with a registration roller to warp the document. Unfortunately, the method involves making a noise between the registration roller and the document, which degrades the low-noise running.

In view of this, another technology has recently received attention. According to the technology, skew itself in a document is not corrected. To be specific, image processing is performed of scanning an image recorded on the skewed document and rotating the scanned image, so that an image having no skew is generated.

Before skew correction by the image processing, it is necessary to detect an amount of skew in a document. Conventional technologies for detection of an amount of skew in a document include the technologies described in Japanese Laid-open Patent Publication Nos. 2003-259089, 2003-259090, 2003-319160, 2009-042814, 2002-199179, 2013-146034, and 2015-015687.

The technology described in Japanese Laid-open Patent Publication No. 2003-259089 discloses the following: when an original image is read, a shadow due to the thickness of the original is also read at once. The inclination angle of an end of the original is detected based on the positions of black pixels due to the shadow. The technology described in Japanese Laid-open Patent Publication No. 2003-259090 discloses applying density conversion to sharpen an edge of a shadow in an image read out. The technology described in Japanese Laid-open Patent Publication No. 2003-319160 discloses sharpening a shade part by filtering using a Laplacian filter.

Using Hough transform to determine a side of an image is disclosed in Japanese Laid-open Patent Publication Nos. 2009-042814, 2002-199179, 2013-146034, and 2015-015687. The determination of the side tells an inclination of the side. The technology described in Japanese Laid-open Patent Publication No. 2015-015687 discloses using a method of least squares as a method for detecting a skew angle.

An amount of skew in a document can be detected more precisely by performing image processing for the detection than by using a sensor to detect whether or not a document is present. The detection without such a sensor leads to reduction in cost of components.

However, the detection of an amount of skew in a document by image processing involves a problem. The problem is how an amount of skew is detected rapidly and accurately based on gradation values of pixels of an image.

In detecting an amount of tilt of a shadow of the original image as described in Japanese Laid-open Patent Publication Nos. 2003-259089, 2003-259090, and 2003-319160, a tilt amount thereof cannot be detected, or, even if the detection is made, an error in the tilt amount is sometimes large in the following cases: where a shadow has a large width due to thick original documents or upward warp of the entire edge of the original; and where a shadow has an uneven width due to upward warp of a partial edge of the original. In short, such conventional technologies involve a problem that a state of the original influences accuracy in the detection.

Determining a side of an image by Hough transform as disclosed in Japanese Laid-open Patent Publication Nos. 2009-042814, 2002-199179, 2013-146034, and 2015-015687 involves a problem of taking a long time to perform image processing for skew detection.

SUMMARY

The present invention has been achieved in light of such a problem, and therefore, an object of an embodiment of the present invention is to detect an amount of skew in a document with an accuracy independent of a state of the document in a shorter time than ever before.

To achieve at least one of the objects mentioned above, according to an aspect, a device is provided which detects an amount of skew in a sheet-like document, the document being placed on a surface of a background plate or passing over the surface of the background plate. The device includes a light source configured to apply light to the document; a scan portion configured to scan an area including at least one edge of the document with light, by the light source, reflected from the document to obtain an input image; a boundary point detector configured to detect, for each position in a main scanning direction, a boundary point between the document and the background plate in the input image; a boundary point group of interest setting portion configured to set a boundary point group of interest from among the boundary points detected, the boundary point group of interest including two boundary points spaced away from each other in the main scanning direction and boundary points located between the two boundary points; a midpoint setting portion configured to set a midpoint of an oblique line for approximating a part or a whole of the edge based on positions of the boundary point group of interest in the main scanning direction and in a sub-scanning direction; an oblique line setting portion configured to set, as the oblique line, a line which passes through the midpoint and slants to the main scanning direction; a skew modifying portion configured to modify an amount of skew of the oblique line so that an error between the boundary point group of interest and the oblique line is reduced; and an amount of skew determination portion configured to determine that an amount of skew in the document is an amount of skew of the oblique line having the error equal to or smaller than a threshold.

Preferably, the background plate is white or glossy.

Preferably, the boundary point detector detects, as the boundary point, among pixels of the input image, a pixel which is present in a vicinity of the sub-scanning direction with respect to the background plate; has a gradation value of brightness information equal to or smaller than a first threshold; and has a difference, from the gradation value of the brightness information on the background plate, equal to or greater than a second threshold. Where a plurality of boundary points is detected, a boundary point closest to the sub-scanning direction with respect to the background plate is preferably selected. The boundary point detector may exclude, from a result of detection, among the boundary points detected, a boundary point having a distance in the sub-scanning direction from an adjacent boundary point in the main scanning direction equal to or greater than a threshold.

BRIEF DESCRIPTION OF THE DRAWINGS

The above and other objects, advantages, and features of the present invention will become more fully understood from the detailed description given hereinbelow and the appended drawings which are given by way of illustration only, and thus not intended as a definition of the limits of the present invention.

FIG. 10 is a flowchart for depicting an example of the flow of the entire processing by an image processing apparatus.

FIG. 11 is a flowchart for depicting an example of the flow of region of interest setting processing.

FIG. 16 is a flowchart for depicting an example of the flow of skew direction determination processing.

FIG. 20 is a flowchart for depicting an example of the flow of processing for determining an amount of skew in a first direction.

DESCRIPTION OF THE PREFERRED EMBODIMENTS

Hereinafter, an embodiment of the present will be described with reference to the drawings. However, the scope of the invention is not limited to the illustrated examples.

Figure 1:
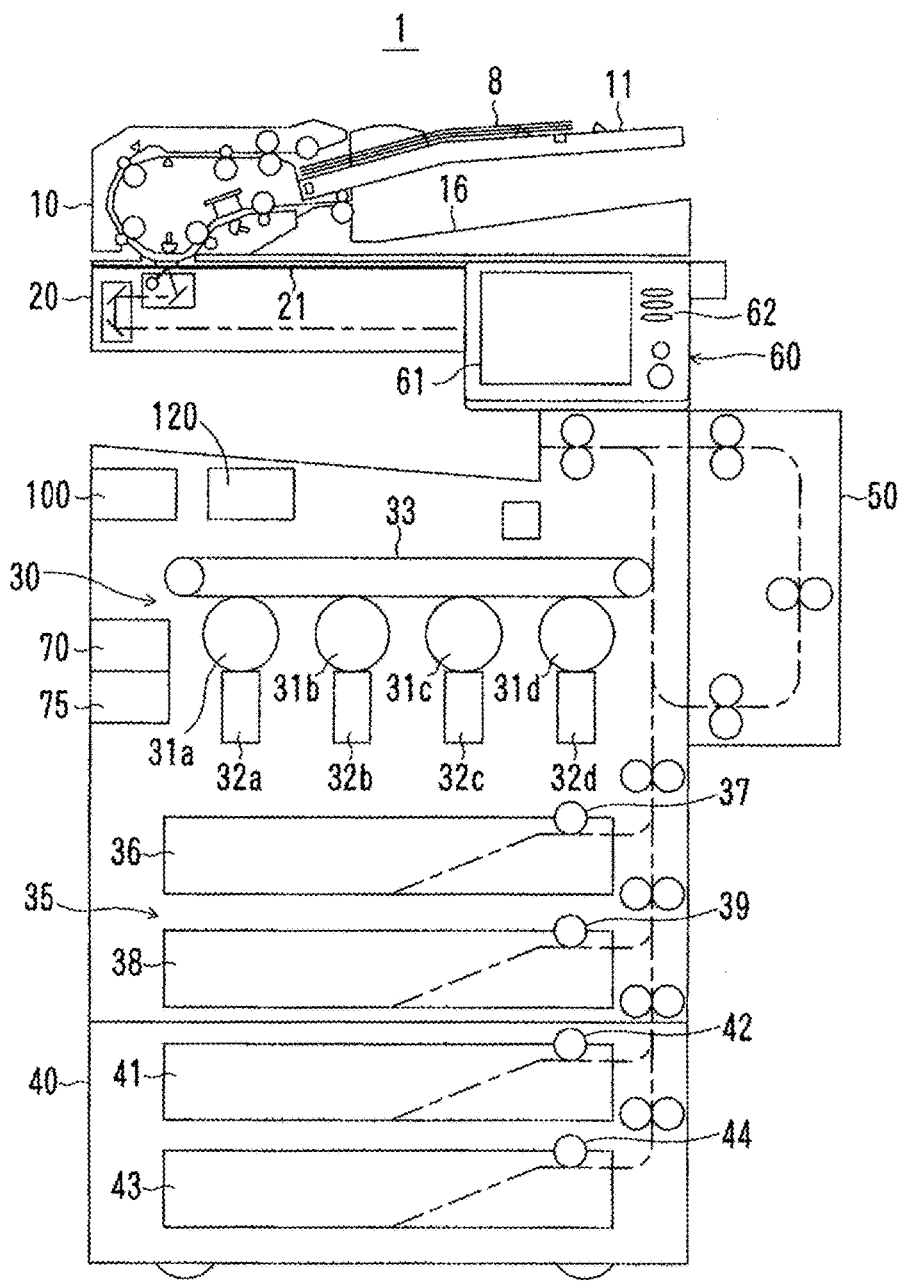
FIG. 1 is a schematic diagram showing an example of the structure of an image processing apparatus according to an embodiment of the present invention.
Figure 2:
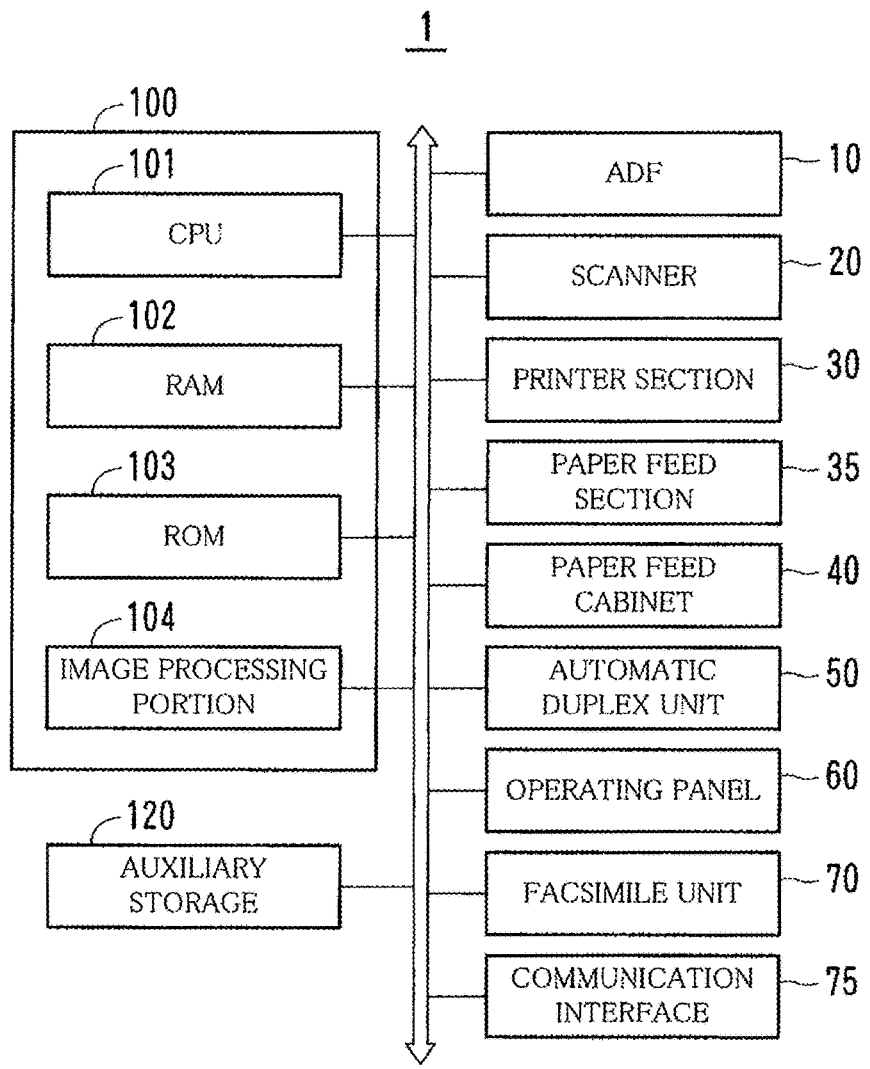
FIG. 2 is a diagram showing an example of the hardware configuration of an image processing apparatus and a control unit thereof.

FIG. 1 shows an example of the structure of an image processing apparatus 1 according to an embodiment of the present invention. FIG. 2 shows an example of the hardware configuration of the image processing apparatus 1 and a control unit 100 thereof.

The image processing apparatus 1 is an MFP in which functions of a copier, a printer, a facsimile machine, and so on are combined. In executing a job of reading an image depicted on a document sheet 8 to apply processing to data on the image, the image processing apparatus 1 operates as a device for detecting an amount of skew in the document 8. Such a job is, for example, copying, creating image data (scanning), and facsimile transmission.

The image processing apparatus 1 is provided with an automatic document feeder (ADF) 10, a scanner 20, a printer section 30, a paper feed section 35, a paper feed cabinet 40, an automatic duplex unit 50, an operating panel 60, a facsimile unit 70, a communication interface 75, the control unit 100, an auxiliary storage 120, and so on.

The automatic document feeder 10 includes a paper feeder 11 and a paper output tray 16. The automatic document feeder 10 conveys a document 8 having at least one sheet placed on the paper feeder 11 to the paper output tray 16. While the document 8 is conveyed, the scanner 20 reads an image depicted on the document 8. The paper feeder 11 has a sensor for detecting whether the document 8 is present or not.

The automatic document feeder 10 also serves as a cover that is put over a platen glass 21 of the scanner 20. The automatic document feeder 10 is formed to be openable with respect to a shaft provided in the rear of the image processing apparatus 1. A user of the image processing apparatus 1 lifts a front end of the automatic document feeder 10 to expose the platen glass 21, and then places a document onto the platen glass 21.

The scanner 20 is operable to optically read an image depicted on the document 8 conveyed by the automatic document feeder 10, or, alternatively, an image depicted on the document 8 placed on the platen glass 21 by the user. The scanner 20 sends, to the control unit 100, image data representing gradation values of pixels of the image thus read.

The structures of the automatic document feeder 10 and of the scanner 20 are described in more details later.

The printer section 30 is operable to print an image onto paper by electrophotographic steps. The printer section 30 includes photoconductive drums 31a, 31b, 31c, and 31d for forming toner images of yellow, magenta, cyan, and black, respectively, and exposure scanning units 32a, 32b, 32c, and 32d. In the printer section 30, the four toner images of different colors are overlaid on a transfer belt 33 to be transferred thereto. The toner images thus overlaid are transferred to paper conveyed by the paper feed section 35.

The paper feed section 35 includes paper feed cassettes 36 and 38 into which paper sheets are loaded, and pickup rollers 37 and 39 for grabbing and sending out paper sheets from the paper feed cassettes 36 and 38. The paper feed section 35 is operable to provide paper sheets to the printer section 30.

As with the paper feed section 35, the paper feed cabinet 40 includes paper feed cassettes 41 and 43, and pickup rollers 42 and 44 for grabbing and sending out paper sheets from the paper feed cassettes 41 and 43. The paper sheets sent out by the pickup rollers 42 and 44 are supplied to the printer section 30 through a paper path of the paper feed section 35.

The automatic duplex unit 50 is to enable execution of double-sided printing. The automatic duplex unit 50 receives, from the printer section 30, a sheet having an image printed on one face thereof, turns over the sheet, and then returns the sheet to the printer section 30.

The operating panel 60 includes a touch panel display 61 for displaying a screen on which the user performs input operation and a key entry portion 62 having hard keys. The operating panel 60 sends, to the control unit 100, a signal depending on the input operation by the user.

The facsimile unit 70 sends and receives image data with an external facsimile terminal in accordance with a protocol such as G3.

The communication interface 75 is used to communicate, via a communication line, a device such as a USB memory detachable from a personal computer, a smartphone, and the image processing apparatus 1. Examples of the communication line are a local area network line (LAN), the Internet, and a near field communication line.

The control unit 100 is a main controller which controls overall operation of the image processing apparatus 1. Referring to FIG. 2, the control unit 100 is configured of a Central Processing Unit (CPU) 101, a Random Access Memory (RAM) 102, a Read Only Memory (ROM) 103, an image processing portion 104, and so on.

The ROM 103 stores, therein, a program for controlling the automatic document feeder 10, the scanner 20, and the printer section 30, so that the image processing apparatus 1 operates as a copier, a facsimile machine, and an image reader. The ROM 103 also stores, therein, a skew correction program which controls the image processing portion 104 to detect an amount of skew SV in the document 8 and to correct skew of a read image. The programs are loaded to the RAM 102 as necessary, and are executed by the CPU 101.

The image processing portion 104 applies, to the image data sent by the scanner 20, processing related to characteristics of image scanning optical system. The processing is, for example, shading correction or chromatic aberration correction. The image processing portion 104 serves to perform the whole or a part of processing for detecting the amount of skew SV in the document 8, and the whole or a part of skew correction processing for correcting the image data based on the amount of skew SV detected. The image processing portion 104 is configured to include hardware for detecting the amount of skew SV more rapidly than the case of detecting the amount of skew SV only with software.

The auxiliary storage 120 stores, thereinto, the image data sent by the control unit 100. Examples of the auxiliary storage 120 are a hard disk drive and a Solid State Drive (SSD).

Figure 3:
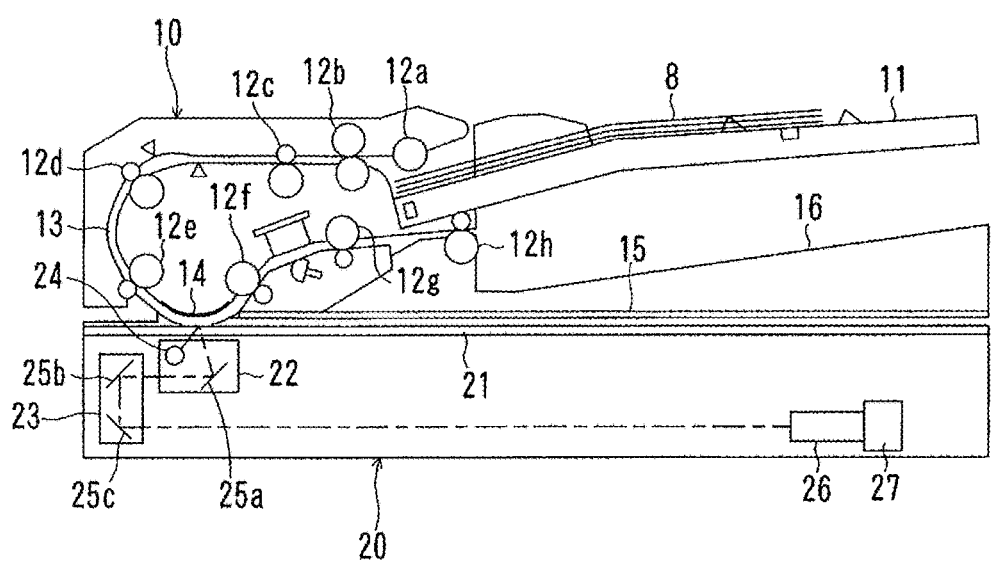
FIG. 3 is a diagram showing an example of the structure of an automatic document feeder and a scanner.

FIG. 3 shows an example of the structure of the automatic document feeder 10 and the scanner 20.

The automatic document feeder 10 includes the paper feeder 11, a pickup roller 12a, a separation roller pair 12b, feed roller pairs 12c, 12d, 12e, 12f, 12g, and 12h, a paper path 13, background plates 14 and 15, and the paper output tray 16.

The pickup roller 12a takes out the topmost document sheet 8 from the paper feeder 11. The separation roller pair 12b rotates to allow only one sheet to pass therethrough when a plurality of document sheets 8 is taken out at one time.

The feed roller pairs 12c, 12d, 12e, 12f, 12g, and 12h are disposed at regular intervals along the paper path 13. The feed roller pairs 12c, 12d, 12e, 12f, 12g, and 12h convey the document 8 taken out of the paper feeder 11, pass the document 8 through a scan position, and then discharge the document 8 to the paper output tray 16.

When the document 8 is conveyed between the feed roller pair 12e and the next feed roller pair 12f along the paper path 13, an image depicted on a side of the document 8 facing downward is read, at the scan position, by an image sensor 27 through a light source unit 22 being in a stationary state. To be specific, the document 8 moves along the scan position on the background plate 14 from a leading edge to a trailing edge, so that the document 8 is scanned in the main scanning direction.

The background plates 14 and 15 are members which are contained, as the background of the document 8, in an imaging area of reading by the scanner 20. The background plate 14 is disposed to be a part of a wall surface of the paper path 13. The background plate 14 serves to be the background of the document 8 for the case where the automatic document feeder 10 feeds the document 8 so that an image depicted thereon is read. The background plate 15 is disposed to face the platen glass 21 when the automatic document feeder 10 supporting the background plate 15 is closed. The background plate 15 serves to be the background of the document 8 for the case where an image depicted on the document 8 placed on the platen glass 21 is read.

The background plates 14 and 15 are made of resin, metal, or a composite material thereof. The background plates 14 and 15 have white or glossy surfaces. The background plates 14 and 15 may be made of the same material as each other or of materials differing from each other.

The scanner 20 is a flat-bed scanner. The scanner 20 includes the light source unit 22, a mirror unit 23, an imaging lens 26, and the image sensor 27. The light source unit 22 has a light source 24 for irradiating the document 8 with light and a mirror 25a for directing light reflected from the document 8 to the mirror unit 23. The light source 24 is, for example, an LED array. The light source 24 is configured to irradiate the document 8 with light across the entire length of the document 8 in a direction orthogonal to the conveyance direction of the document 8. The mirror unit 23 includes mirrors 25b and 25c for reflecting the light entering from the light source unit 22 to let the reflected light enter into the image sensor 27. The light source unit 22 and the mirror unit 23 are configured to be movable in parallel with the platen glass 21.

Where an image is captured by feeding the document 8 with the automatic document feeder 10g, neither the light source unit 22 nor the mirror unit 23 moves. The light source unit 22 remains stationary below the background plate 14. The light source 24 applies, for example, white light, toward the undersurface of the document 8 passing on the surface of the background plate 14 from the trailing side of the document 8 in the travel direction through the platen glass 21. The light applied is reflected from the document 8 and the background plate 14 to travel to the mirrors 25a, 25b, and 25c and the imaging lens 26, so that the resultant light enters the image sensor 27. Thereby, an image corresponding to the irradiated part of the document 8 and the background plate 14 is formed on an imaging area of the image sensor 27. The image sensor 27 reads the image thus formed as an array of pixels. Main scanning is performed by driving the image sensor 27. Sub scanning is performed by conveying the document 8. The main scanning and the sub scanning are so performed that the image depicted on the document 8 is read line-by-line together with the background plate 14.

Where an image is captured from the document 8 placed on the platen glass 21, the light source unit 22 moves at a constant speed, and the mirror unit 23 moves at a speed half of that of the light source unit 22 in such a manner that the light path has a constant length. In such a case, sub scanning is performed by moving the light source unit 22 and the mirror unit 23. Main scanning is performed by driving the image sensor 27.

The description goes on to a function to detect an amount of skew in the document 8 by taking an example where an image is scanned while the automatic document feeder 10 feeds the document 8. The detection of an amount of skew in the document 8 is possible also for the case where an image is scanned from the document 8 placed on the surface of the background plate 15.

Figure 4A:
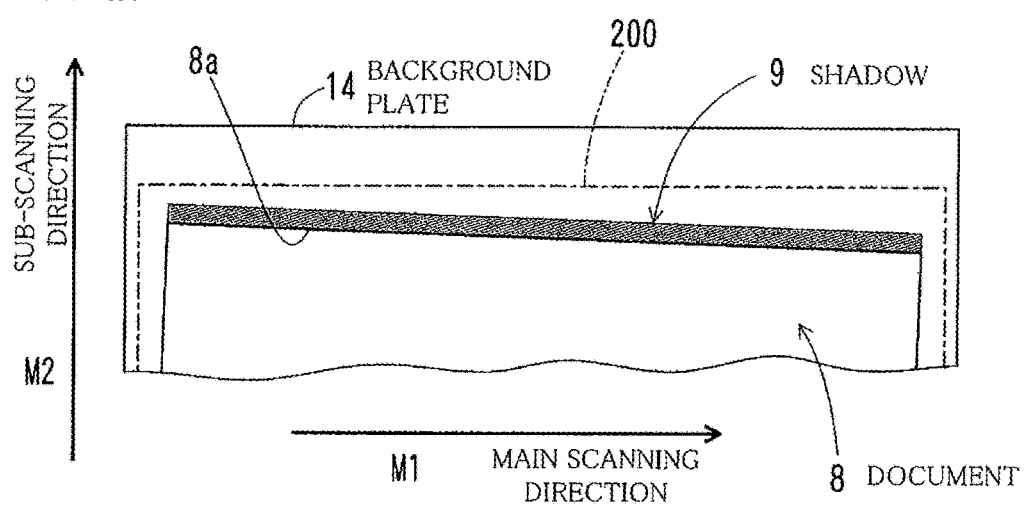
FIGS. 4A and 4B are diagrams showing an example of a document and a background plate as viewed from below and an input image corresponding thereto.
Figure 4B:
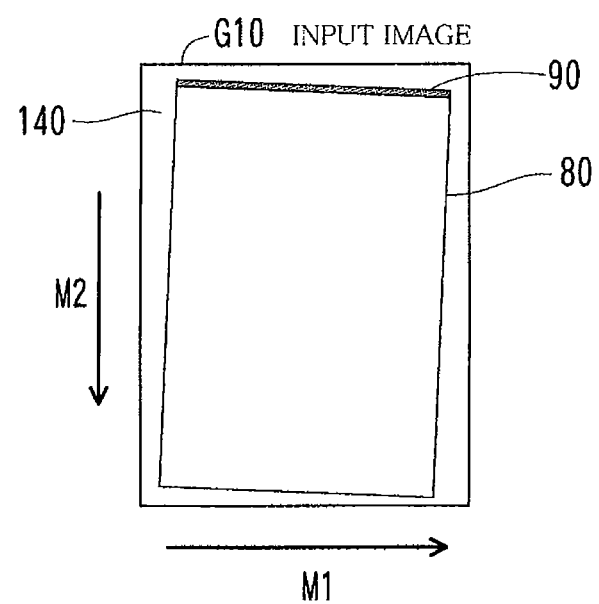

FIGS. 4A and 4B show an example of the document 8 and the background plate 14 as viewed from below and an input image G10 corresponding thereto. In other words, FIGS. 4A and 4B are diagrams showing the background plate 14 and the document 8 passing over the surface thereof as seen from the light source unit 22 of FIG. 3.

Referring to FIGS. 4A and 4B, main scanning is cyclically performed at a predetermined density while the document 8 is conveyed in the sub-scanning direction M2 to pass over the surface of the background plate 14. As show in FIG. 4A, the main scanning direction M1 is orthogonal to the sub-scanning direction M2. The main scanning and the sub-scanning are performed so that a region 200 is scanned. The region 200 is a rectangular region which encompasses the entirety of the document 8.

While the light source 24a applies light to a leading end 8a of the document 8 and therearound, a band-like shadow 9 is made in advance of the leading end 8a of the document 8 in the conveyance direction thereof. The shadow 9 extends along the entire length of the document 8 in the main scanning direction M1 and has a width corresponding to the thickness of the document 8. The image sensor 27 takes an image of the shadow 9 together with the document 8 and the background plate 14.

In short, as shown in FIG. 4B, the input image G10 having a document part 80, a background part 140, and a shadow part 90 is obtained as the read image. The document part 80 corresponds to the document 8. The background part 140 corresponds to the background plate 14. The shadow part 90 corresponds to the shadow 9. The input image G10 is an image obtained by scanning a rectangular region including four areas around the four sides of the document 8. The input image G10 usually contains the entirety of the document part 80 or sometimes contains a part thereof.

The image processing apparatus 1 detects an amount of skew in the document 8 by image processing based on the input image G10 having the background part 140 and the shadow part 90.

Referring to FIG. 4B, the upper right of the document part 80 is inclined downward with respect to the main scanning direction M1. In other words, a distance between the front end (upper side in the drawing) of the input image G10 and the front end of the document part 80 is larger in the upper right of the input image G10 than in the upper left thereof.

Figure 5:
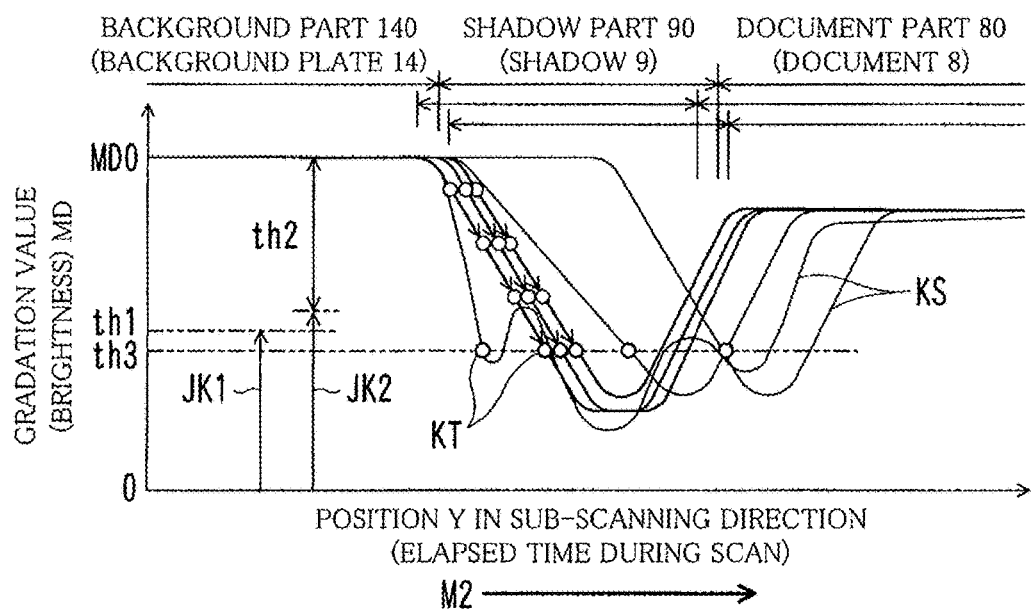
FIG. 5 is a diagram showing an example of change in gradation values of an input image in the sub-scanning direction.

FIG. 5 shows, by using curves KS, an example of change in gradation value MD of the input image G10 in the sub-scanning direction. The curves KS of FIG. 5 correspond to the positions of pixels in the main scanning direction. The gradation value MD indicates lightness or brightness. The gradation value MD is large for a bright pixel and small for a dark pixel.

As shown in the change in gradation values MD of the input image G10 in the sub-scanning direction M2 of FIG. 5, in a general case where the document 8 has a light background color, the gradation value MD is large (bright) in the background part 140, is getting smaller (darker) in transition to the shadow part 90, and is getting larger in transition from the shadow part 90 to the document part 80.

The background plate 14 has a white or glossy surface as described earlier. Therefore, a gradation value MD0 in the background part 140 is usually the maximum value, and is absolutely higher than those in any other parts of the input image G10. The gradation value MD0 of the background part 140 is settable at or close to the upper limit value of the brightness range by adjusting output from the light source 24 or by adjusting sensitivity of the image sensor 27.

The shadow part 90 corresponds to an image of a part, of the background plate 14, which is shielded from light. The gradation value MD of the shadow part 90 is thus definitely smaller than the gradation value MD0 of the background part 140. It is noted, however, that the shadow 9 tends to become brighter in an area farther from the leading end 8a of the document 8 because the irradiated light streams. For this reason, the gradation value MD of the shadow part 90 is large in an area close to the background part 140, and is smaller in an area farther from the background part 140.

In contrast, the gradation value MD of the document part 80 depends on optical characteristics of the document 8, for example, the background color of the document 8 and the optical reflectance of the surface thereof. If the document 8 contains an image extending to the edges thereof, the gradation value MD of the document part 80 depends also on the image density. Therefore, it is not always true that the gradation value of the document part 80 is higher than the gradation value of the shadow part 90. The gradation value of the document part 80 is sometimes approximately the same as that of the shadow part 90.

In view of this, the image processing apparatus 1 is configured to detect an amount of skew SV in the document 8 independently of the optical characteristics of the document 8 and so on. The image processing apparatus 1 thus detects, as a boundary point between the document 8 and the background plate 14, a boundary point KT between the background part 140 and the shadow part 90 (boundary point closer to the background part 140) rather than a boundary point between the shadow part 90 and the document part 80 (boundary point closer to the document part 80). In other words, when detecting a plurality of boundary points, the image processing apparatus 1 selects a boundary point KT closest to the sub-scanning direction with respect to the background plate 14.

To be more specific, the gradation values MD of pixels are checked in order starting from the top pixel in the sub-scanning direction M2. Then, the image processing apparatus 1 sets, to the boundary point KT, a position Y, in the sub-scanning direction M2, of the first pixel having a gradation value MD equal to or lower than a threshold th3. Similar steps are performed to detect a boundary point KT for a position X of each pixel in the main scanning direction M1. Hereinafter, the threshold th3 is sometimes referred to as a "threshold th3 of a boundary point".

The threshold th3 satisfies the following two conditions: condition JK1 that the threshold th3 is equal to or smaller than a first threshold th1; and condition JK2 that a difference from the gradation value MD0 of the background plate 14 is equal to or greater than a second threshold th2. The condition JK1 is fixed. The condition JK2 is variable depending on the optical characteristics of the background plate 14 and output from the light source 24.

Referring to each curve KS of FIG. 5, starting from the gradation value MD0 of the background part 140, the gradation value MD is getting lower as the position in the sub-scanning direction forwards. In the transition, the gradation values MD of pixels are sampled. A pixel at which the gradation value MD first reaches the threshold th3 or lower is detected as the boundary point KT. Where a plurality of pixels having the gradation value MD equal to the threshold th3 is detected, a pixel at which the gradation value MD first reaches the threshold th3 or lower is detected as the boundary point KT.

Where the smallest gradation value MD satisfying the condition JK2 is larger than the first threshold th1, it is possible to make the threshold th3 of the boundary point equal to the first threshold th1. Where the smallest gradation value MD satisfying the condition JK2 is smaller than the first threshold th1, it is possible to select the smallest gradation value MD satisfying the condition JK2 as the threshold th3 of the boundary point.

The image processing apparatus 1 detects, as the amount of skew SV in the document 8, an amount of inclination of the shadow 9 corresponding the leading end 8a of the document 8 based on the boundary point KT detected.

Meanwhile, the width of the shadow 9 becomes uneven due to the influence of deformation (curve) or upward warp of the document 8. To be specific, in some cases, the boundary points KT of the positions X are not aligned in the main scanning direction M1 and are disposed to make an irregular curve. The image processing apparatus 1 is capable of detecting an amount of skew SV in the document 8 in such cases.

Figure 6:
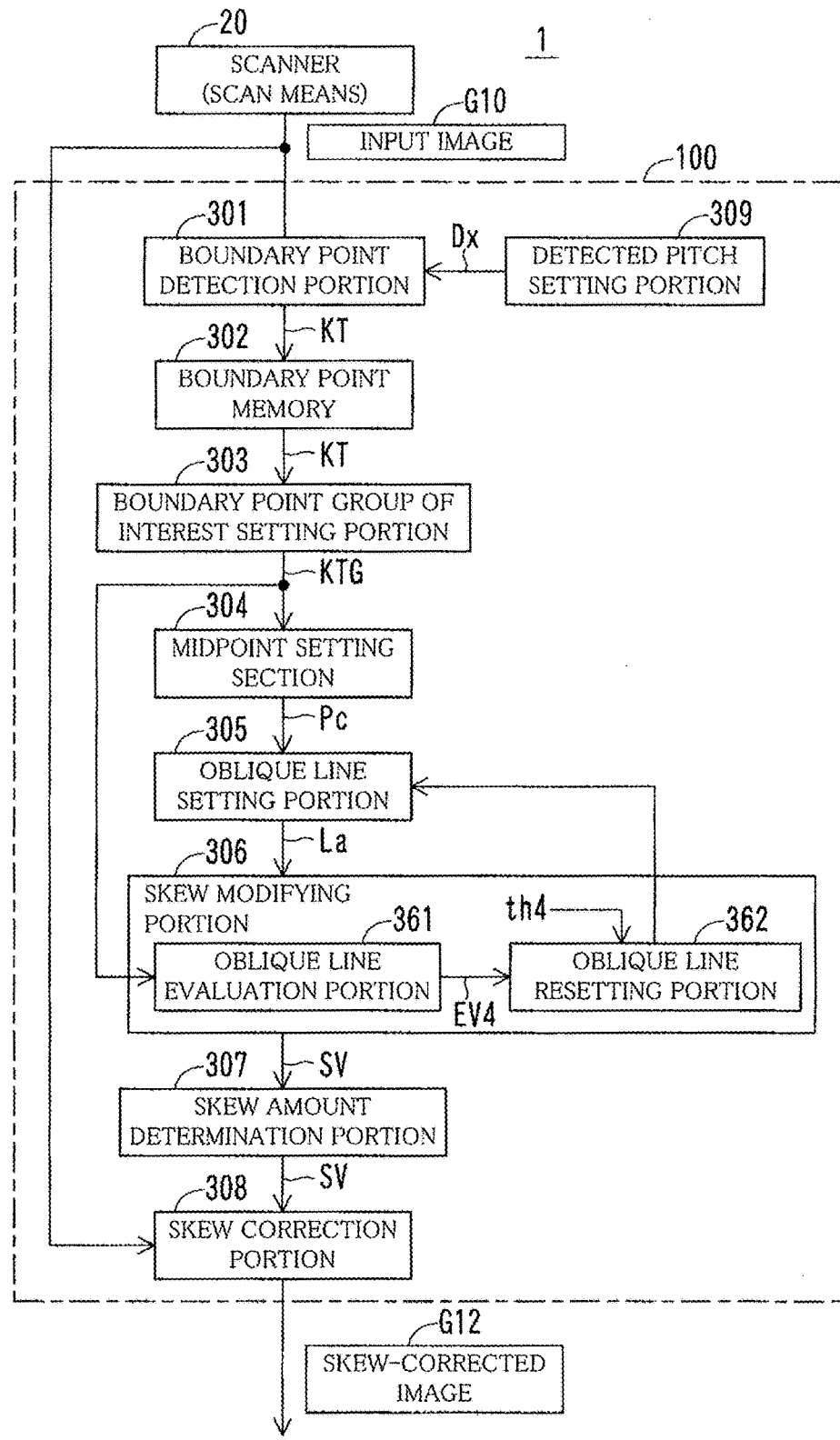
FIG. 6 is a diagram showing an example of the functional configuration of an image processing apparatus.
Figure 7:
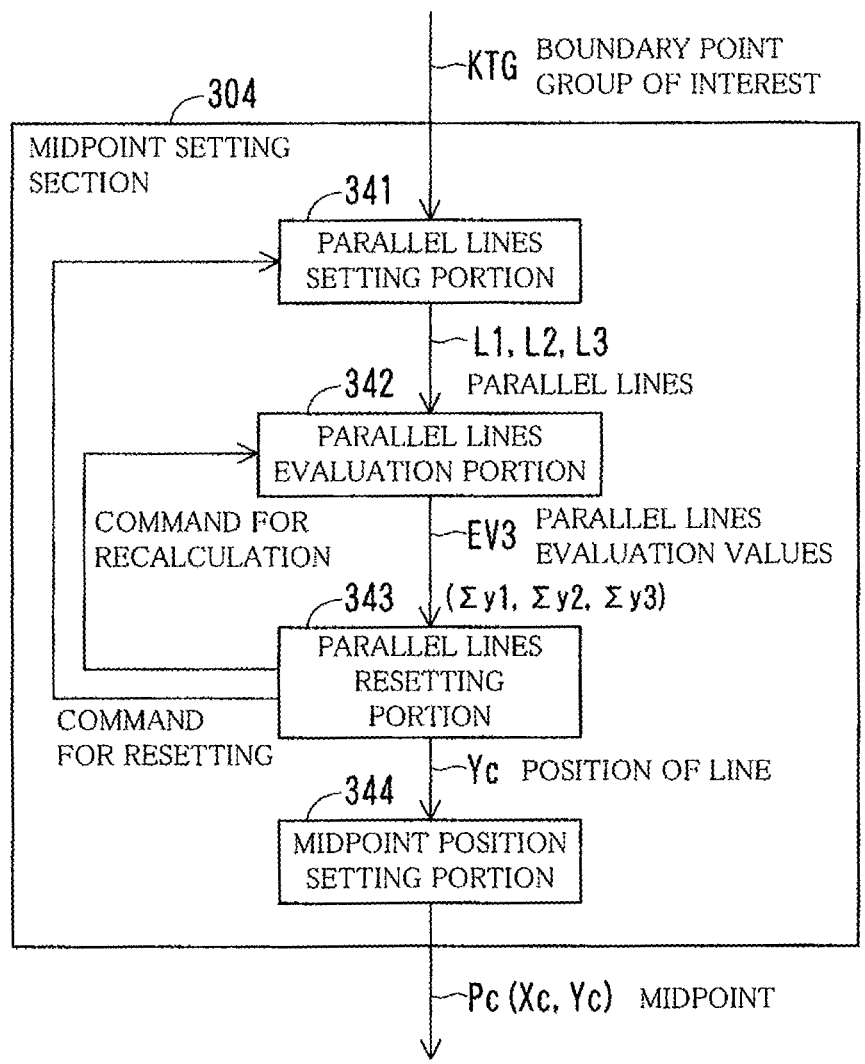
FIG. 7 is a diagram showing an example of the functional configuration of a midpoint setting portion.
Figure 8:
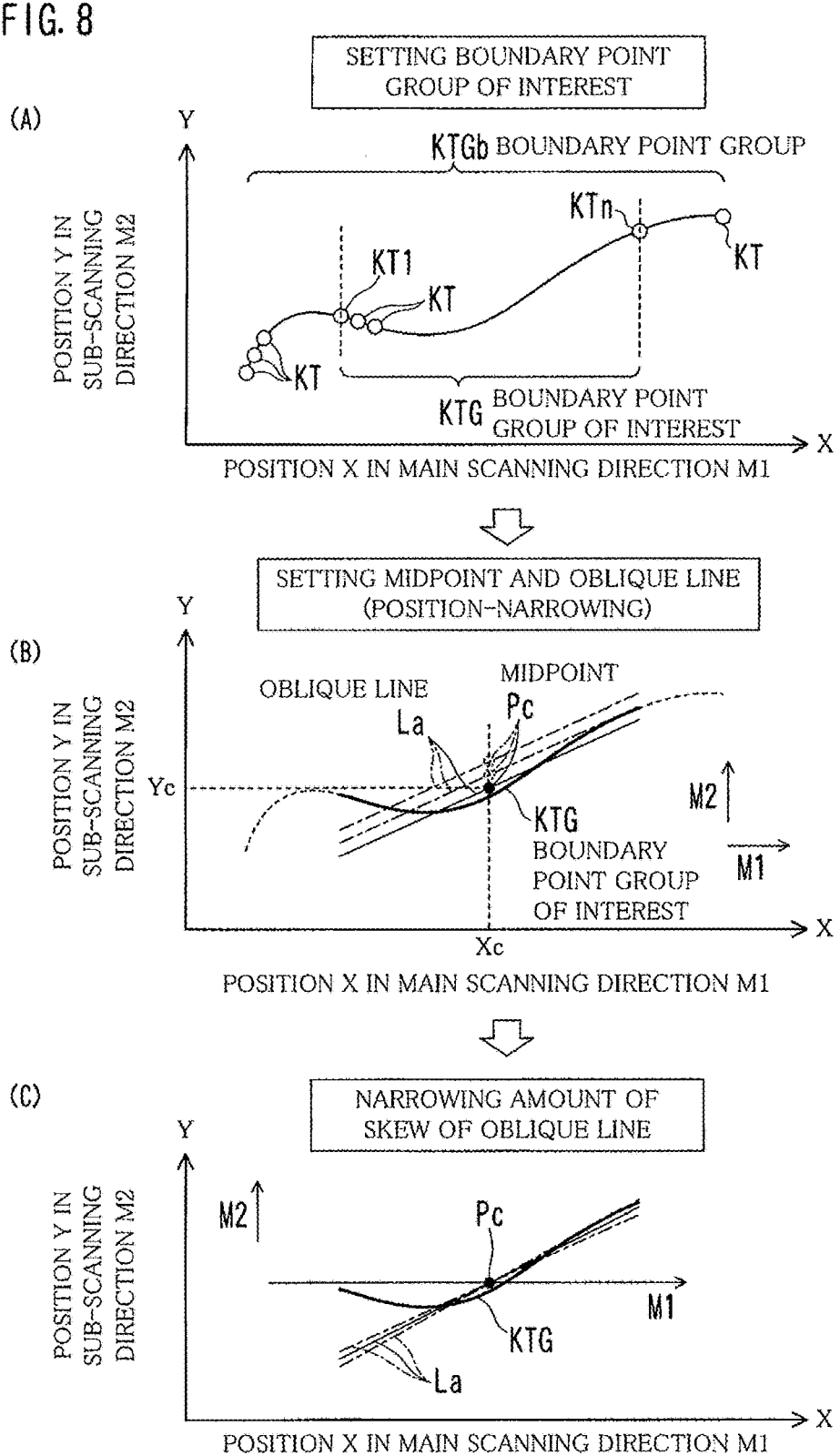
FIG. 8 is a schematic diagram showing an outline of a method for detecting an amount of skew.

FIG. 6 shows an example of the functional configuration of the image processing apparatus 1. FIG. 7 shows an example of the functional configuration of a midpoint setting portion 304. FIG. 8 is a schematic diagram showing an outline of a method for detecting an amount of skew SV.

Referring to FIG. 6, the image processing apparatus 1 is configured of a boundary point detection portion 301, a boundary point memory 302, a boundary point group of interest setting portion 303, a midpoint setting section 304, an oblique line setting portion 305, a skew modifying portion 306, a skew amount determination portion 307, a skew correction portion 308, a detected pitch setting portion 309, and so on. The functions of these portions are implemented by the hardware configuration of the control unit 100 and by execution of the skew correction program by the CPU 101.

The boundary point detection portion 301 obtains an input image G10 from the scanner 20 serving as a scan means, and detects a boundary point KT between the document 8 and the background plate 14 (or background plate 15) based on a change in gradation value MD of the input image G10 in the sub-scanning direction M2. As discussed earlier, the gradation value MD is brightness information indicating higher value for greater brightness. Instead of this, however, the gradation value MD may be density information indicating higher value for greater darkness.

The boundary point detection portion 301 detects, as the boundary point KT, a pixel among the pixels of the input image G10. The pixel detected satisfies the following conditions: To be present in the vicinity of the sub-scanning direction M2 with respect to the background plate 14 or 15; To have a gradation value MD, of the brightness information, equal to or smaller than the first threshold th1; and To have a difference from the gradation value MD0, of the brightness information on the background plate 14 or 15, equal to or greater than the second threshold th2. The steps for detecting a boundary point KT at a position X for each pixel in the main scanning direction M1 are the same as those discussed above.

The boundary point detection portion 301 stores, into the boundary point memory 302, boundary points KT detected for the positions X in the main scanning direction M1. Where the maximum value of the size (number of pixels) of the input image G10 in the main scanning direction M1 is, for example, 8192, a maximum of 8192 boundary points KT are potentially stored into the boundary point memory 302. In actual cases, the number of boundary points KT depends on the size of the document 8. The boundary point memory 302 is provided, for example, in the RAM 102.

The data stored as the boundary point KT indicates the position Y in the sub-scanning direction M2. The data may indicate a pixel number (main scanning line number) of the input image G10 in the sub-scanning direction M2, or, alternatively, indicate a count value of the number of pixels from the top pixel in the sub-scanning direction M2 to the boundary point KT. Alternatively, addresses may be allocated in the arrangement order of to the pixels in the main scanning direction M1, and the position X of each of the boundary points KT in the main scanning direction M1 may be identified based on the address in the boundary point memory 302. A set of the position X and the position Y may be stored as data on the boundary point KT.

The data indicating the position Y is so set to have a smaller value for the position closer to the front end of the input image G10 and to have a larger value for the position farther therefrom.

The boundary point detection portion 301 follows information sent by the detected pitch setting portion 309 to change a pitch Dx in the main scanning direction M1 between the positions X at which the boundary points KT are detected in accordance with the size of the document 8 in the main scanning direction M1.

The gradation value MD tends to be abnormal at both ends of the input image G10 in the main scanning direction M1. In addition to both ends of the input image G10, the gradation value MD sometimes turns to be abnormal (irregular) due to the influence from noise. Therefore, if an irregular boundary point KT is detected, the irregular boundary point KT may be invalidated and be excluded from the target for the subsequent processing and beyond, namely, may be excluded from the detection result. For example, when the position Y detected as the boundary point KT has a difference of a preset threshold or greater from the position Y of a normal boundary point KT adjacent to the detected position Y, the detected position Y is regarded as an irregular boundary point KT, and is not stored into the boundary point memory 302, for example.

The boundary point group of interest setting portion 303 sets a boundary point group of interest KTG which is used for the subsequent processing for detecting an amount of skew SV. As shown in FIG. 8(A), among the boundary points KT detected along the main scanning direction M1, the boundary point group of interest KTG has two boundary points KT1 and KTn spaced away from each other in the main scanning direction M1 and at least one boundary point KT present between the two boundary points KT1 and KTn. In other words, the boundary point group of interest setting portion 303 selects specific boundary points KT from among the detected boundary points KT to set the specific boundary points KT to be the boundary point group of interest KTG.

The boundary points KT1 and KTn at both ends of the boundary point group of interest KTG may be boundary points KT at both ends, in the main scanning direction M1, of a boundary point group KTGb including all of the detected boundary points KT. Alternatively, the boundary points KT1 and KTn at both ends of the boundary point group of interest KTG may be boundary points KT other than the boundary points KT at both ends. In short, the boundary point group of interest KTG may constitute the whole or a part of the boundary point group KTGb. In order to improve the accuracy of detection of an amount of skew SV, more boundary points KT are preferably included in the boundary point group of interest KTG.

Examples of a case where a part of the boundary point group KTGb is defined as the boundary point group of interest KTG include: a case where the continuity of positions of the detected boundary points KT in the main scanning direction M1 is broken by excluding the irregular boundary point KT as discussed above. In such a case, the longest continuous part of positions may be defined as the boundary point group of interest KTG. Where a part which tends to warp upwardly of sides of the document 8 is known, it is possible to define, as the boundary point group of interest KTG, a part of the boundary point group KTGb other than the part which tends to warp upwardly (part presumed to have a good linearity of sides of the document 8).

As shown in FIG. 8(B), the midpoint setting section 304 determines a midpoint Pc of an oblique line La for approximating the whole or a part of the side 8a of the document 8 based on the position X in the main scanning direction M1 and the position Y in the sub-scanning direction M2 of the boundary point group of interest KTG. For example, the midpoint setting section 304 sets candidates for the midpoint Pc. Evaluation is made to the candidates and the candidate most suitable is set at the midpoint Pc.

Referring to FIG. 7, the midpoint setting section 304 includes a parallel lines setting portion 341, a parallel lines evaluation portion 342, a parallel lines resetting portion 343, and a midpoint position setting portion 344.

The parallel lines setting portion 341 sets lines (FIG. 14B) that pass through boundary points KT except boundary points KT at both ends of the boundary point group of interest KTG in the sub-scanning direction M2 and are parallel to the main scanning direction M1. For example, the parallel lines setting portion 341 sets three straight lines L1, L2, and L3 for dividing, in four, the distance between both ends of the boundary point group of interest KTG in the sub-scanning direction M2.

The parallel lines evaluation portion 342 calculates, for each of the straight lines L1, L2, and L3 set by the parallel lines setting portion 341, a parallel lines evaluation value EV3 indicating an error from the boundary point group of interest KTG. For example, the parallel lines evaluation portion 342 calculates, as the parallel lines evaluation values EV3, total sums $\Sigma y1$, $\Sigma y2$, and $\Sigma y3$ of distances y1, y2, and y3. The distances y1, y2, and y3 are distances between the straight lines L1, L2, and L3 and the boundary points KT of the boundary point group of interest KTG, respectively, in the sub-scan direction of the positions X in the main scanning direction M1.

The parallel lines evaluation values EV3 are not limited to the total sums of $\Sigma y1$, $\Sigma y2$, and $\Sigma y3$ of the distances y1, y2, and y3 and may be different values. For example, the parallel lines evaluation value EV3 may be the total sum of distances y1', y2', and y3' to which weights are applied depending on the position X in the main scanning direction M1.

Where the three straight lines L1, L2, and L3 are set, the parallel lines resetting portion 343 repeats resetting of the three straight lines L1, L2, and L3 in such a manner that a straight line having the smallest parallel lines evaluation value EV3 becomes the center line until the parallel lines evaluation value EV3 of the center (second) line becomes the smallest value among those of the three values straight lines L1, L2, and L3. Every time the setting of three straight lines L1, L2, and L3 is changed, the parallel lines evaluation portion 342 is caused to calculate the parallel lines evaluation values EV3.

When the parallel lines evaluation value EV3 of the center line becomes the smallest value among those of the straight lines L1, L2, and L3, the parallel lines resetting portion 343 informs the midpoint position setting portion 344 of a position Yc of the center line in the sub-scanning direction M2.

The midpoint position setting portion 344 sets the position Yc informed, namely, the position in the sub-scanning direction M2 of the straight line having the smallest parallel lines evaluation value EV3 calculated among the straight lines L1, L2, and L3 setting of which is made or changed, at the position Yc of the midpoint Pc of the oblique line La in the sub-scanning direction M2.

The midpoint position setting portion 344 sets the central position of the boundary point group of interest KTG in the main scanning direction M1 at a position Xc of the midpoint Pc in the main scanning direction M1.

Referring back to FIG. 6, the oblique line setting portion 305 sets, as the oblique line La, a straight line passing through the midpoint Pc and slanting to the main scanning direction M1. The oblique line setting portion 305 sets, as candidates for the oblique line La, two oblique lines L4 and L5 (FIGS. 17A and 17B) having oblique directions opposite to each other. The oblique line setting portion 305 then evaluates the oblique lines L4 and L5 based on errors between the boundary point group of interest KTG and the oblique lines L4 and L5, so that one of the oblique lines L4 and L5 evaluated higher than the other is set at the oblique line La. Referring to FIG. 8(C), the oblique lines La slant to the direction rotated, from a state parallel to the main scanning direction M1, in the counterclockwise direction with respect to the midpoint Pc.

The oblique line setting portion 305 is not limited to have a configuration in which two candidates for the oblique line La are set and evaluated. The oblique line setting portion 305 may be configured to determine whether the oblique line La slants to the first direction or the second direction which is opposite to the first direction based on the positions Ymax and Ymin in the main scanning direction M1 of two boundary points KT which serve as both ends of the boundary point group of interest KTG in the sub-scanning direction M2. To be specific, where the position Ymax and the position Ymin are present on the left and right, respectively, with respect to the center in the main scanning direction M1, the oblique line setting portion 305 determines that the oblique line La slants to the first direction. Conversely, where the position Ymax and the position Ymin are present on the right and left, respectively, with respect to the center in the main scanning direction M1, the oblique line setting portion 305 determines that the oblique line La slants to the second direction. According to the arrangement in which the slant direction of the oblique line La is determined based on the positions Ymax and Ymin, the oblique line La can be set for a time shorter than that by the arrangement in which two candidates for lines are evaluated.

The skew modifying portion 306 modifies the amount of skew SV of the oblique line La so that an error between the boundary point group of interest KTG and the oblique line La is reduced. The skew modifying portion 306 includes an oblique line evaluation portion 361 and an oblique line resetting portion 362.

The oblique line evaluation portion 361 calculates an oblique line evaluation value EV4 indicating an error between the boundary point group of interest KTG and the oblique line La. For example, the oblique line evaluation portion 361 calculates, as the oblique line evaluation value EV4, a total sum of distances in the sub-scanning direction M2 between the oblique line La and the individual boundary points KT of the boundary point group of interest KTG. Alternatively, the oblique line evaluation portion 361 may calculate another value as the oblique line evaluation value EV4. Such another value is, for example, a total sum of squares of differences between the positions Y in the sub-scanning direction M2.

The oblique line resetting portion 362 repeats resetting of the oblique line La to replace the oblique line La with a line resulting from rotation of the oblique line La with respect to the midpoint Pc in such a manner that the amount of skew of the oblique line La is gradually reduced for every resetting. The resetting is repeated until the calculated oblique line evaluation value EV4 reaches a threshold th4 or smaller. For every resetting of the oblique line La, the oblique line evaluation portion 361 is caused to calculate the oblique line evaluation value EV4.

The threshold th4 is to determine the accuracy of detection of an amount of skew SV in the document 8. The threshold th4 is selected in accordance with specifications of the image processing apparatus 1. Where the amount of skew SV is represented by angle, the threshold th4 is selected, for example, at an angle in increments of 0.1 degree within a range of 1.0 through 5.0 degrees. Alternatively, where the amount of skew SV is represented by a difference (pixel quantity), in the sub scanning direction M2, between one end of the oblique line La in the main scanning direction M1 and the midpoint Pc, the threshold th4 is selected at a value within the range of 100 through 200. However, the threshold th4 is not limited thereto.

The skew amount determination portion 307 determines that an amount of skew SV in the document 8 is an amount of skew SV of the oblique line La having an error between the boundary point group of interest KTG and the oblique line La equal to or smaller than the threshold.

The skew correction portion 308 applies, to the input image G10, skew correction processing in accordance with the amount of skew SV in the document 8 determined by the skew amount determination portion 307. The skew correction processing is to generate a skew-corrected image G12 having no skew by rotating the input image G10 by an angle corresponding to the amount of skew SV. The skew-corrected image G12 is conveyed to a portion for applying processing thereto depending on what kind of job is to be executed.

The detected pitch setting portion 309 sets a pitch Dx between positions X, in the main scanning direction M1, at each of which the boundary point detection portion 301 detects a boundary point KT in accordance with the size of the document 8 in the main scanning direction M1, then to inform the boundary point detection portion 301 of the pitch Dx. The pitch Dx is a sampling interval on a pixel-by-pixel basis in the main scanning direction M1.

Figure 9:
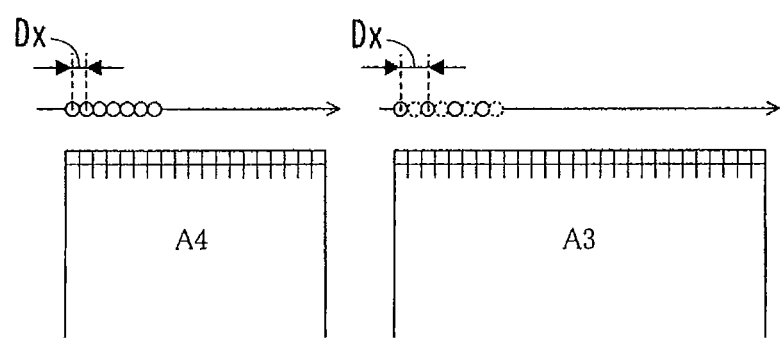
FIG. 9 is a diagram showing an example of setting a pitch between positions at which boundary point are detected.

As shown in FIG. 9, the pitch Dx is set to be greater in a large document 8 than in a small document 8. For example, the pitch Dx is set to correspond to one pixel when the document 8 is an A4-sized document. The pitch Dx is set to correspond to two pixels when the document 8 is an A3-sized document. As for the pitch Dx corresponding to one pixel, the boundary point detection portion 301 detects a boundary point KT for a position X of each of the pixels of the input image G10 in the main scanning direction M1. As for the pitch Dx corresponding to two pixels, the boundary point detection portion 301 detects a boundary point KT for a position X of every two pixels of the input image G10 in the main scanning direction M1.

As described above, for the large document 8, the number of positions X at which the boundary point KT is to be detected is reduced. Consequently, regardless of the size of the document 8, it is possible to detect the boundary points KT on positions X which equally divide the entire length of the document 8 in the main scanning direction M1. The number of boundary points KT is set to be approximately the same regardless of the size of the document 8, so that the storage capacity of the boundary point memory 302 can be fully used independently of the size of the document 8. The equal division of the entire length of the document 8 prevents the accuracy of detection of amount of skew SV from varying depending on the document 8.

The description goes on to an example of detection of an amount of skew SV by the image processing apparatus 1 with reference to flowcharts.

Figure 12A:
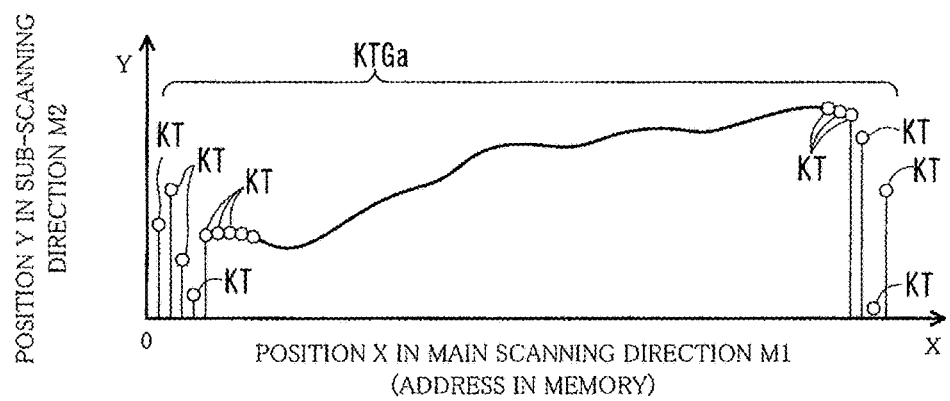
FIGS. 12A-12C are diagrams showing an example of setting of a boundary point group of interest and setting of a region of interest.
Figure 12B:
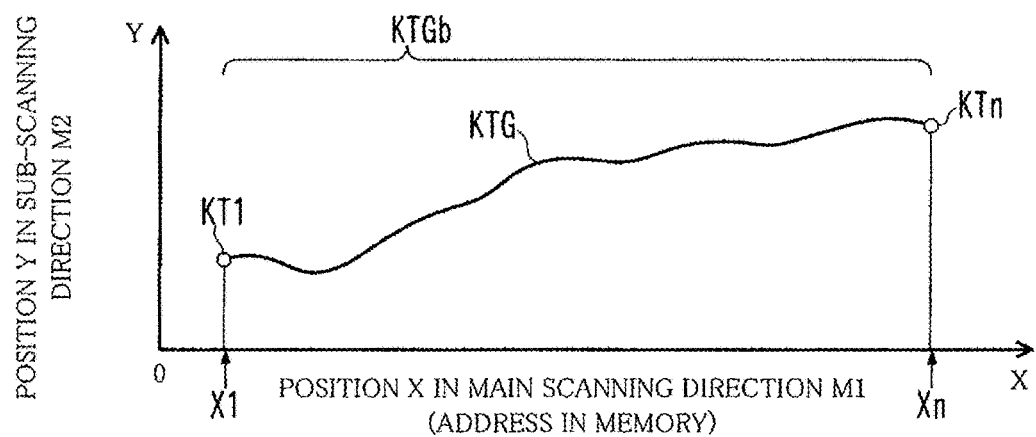
Figure 12C:
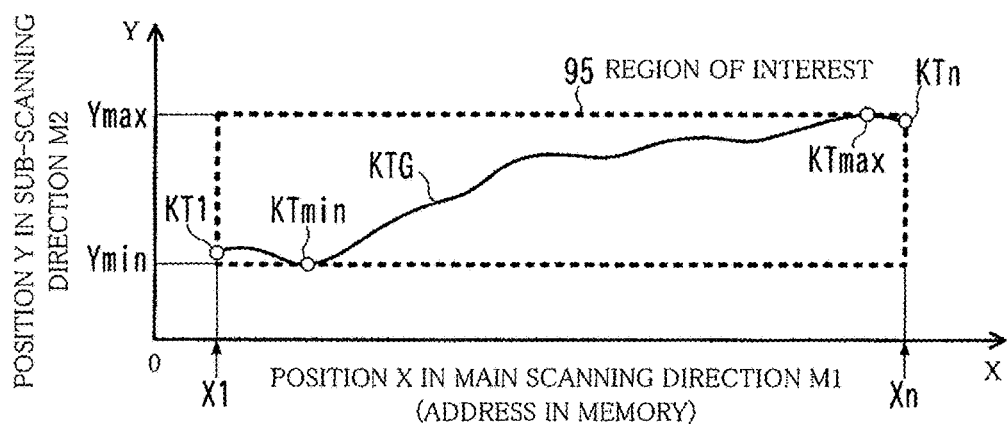

FIG. 10 depicts an example of the flow of the entire processing by the image processing apparatus 1. FIG. 11 depicts an example of the flow of region of interest setting processing. FIGS. 12A-12C show an example of setting of the boundary point group of interest KTG and setting of a region of interest 95.

Referring to FIG. 10, the image processing apparatus 1 performs, in order, region of interest setting processing (Step #11), region of interest narrowing processing (Step #12), and skew direction determination processing (Step #13), so that an amount of skew SV in the document 8 is detected. Thereafter, the image processing apparatus 1 performs skew correction processing for correcting the input image G10 depending on the amount of skew SV (Step #14) to obtain a skew-corrected image G20. The image processing apparatus 1 then prints or sends the skew-corrected image G20 depending on what kind of job is to be executed (Step #15).

In the region of interest setting processing depicted in FIG. 11, the image processing apparatus 1 reads an image recorded in the document 8 placed on the platen glass 21 of the scanner 20 or the paper feeder 11 of the automatic document feeder 10 to obtain the input image G10 (Step #110). The image processing apparatus 1 detects boundary points KT between the document 8 and the background plates 14 and 15 based on gradation values of pixels of the input image G10 and keeps the boundary points KT temporarily (Step #111).

The image processing apparatus 1 determines whether or not each of the boundary points KT kept is valid (Step #112). For example, as for all of boundary points KT in order from the top in the main scanning direction M1, a distance y between a boundary point KT and the next boundary point KT in the sub-scanning direction M2 is determined. If the distance y is larger than a threshold (distance corresponding to 10 pixels, for example), then the image processing apparatus 1 determines that one or both of the boundary points KT are invalid. The image processing apparatus 1 then deletes the boundary point KT which has been determined to be invalid from the result of detection (Step #113). The deletion herein means replacing data stored in the boundary point memory 302 with data indicating "invalid". The residual boundary point KT without being removed, namely, the residual boundary point KT determined to be valid, is an example of a "detected boundary point KT" according to the present invention.

FIG. 12A shows a boundary point group KTGa which has not yet been subjected to the determination as to be valid or invalid. Invalid boundary points KT are present at both ends of the boundary point group KTGa in the main scanning direction M1. FIG. 12B shows a boundary point group KTGb which has been subjected to the determination to delete the invalid boundary points KT.

The whole or a part of the boundary point group KTGb of valid boundary points KT is set to be a boundary point group of interest KTG (Step #114 of FIG. 11). Referring to the example of FIG. 12B, the whole of the boundary point group KTGb is set to be the boundary point group of interest KTG. The boundary point group of interest KTG includes "n" boundary points KT from the top boundary point KT1 to the last boundary point KTn in the main scanning direction M1. In practice, the "n" herein represents a few thousands or more.

Thereafter, the image processing apparatus 1 sets the region of interest 95 shown in FIG. 12C (Step #115). The region of interest 95 is the smallest rectangular region containing the whole of the boundary point group of interest KTG of the input image G10. To be specific, the region of interest 95 in the main scanning direction M1 extends from a position X1 of the boundary point KT1 to a position Xn of the boundary point KTn, and the region of interest 95 in the sub-scanning direction M2 extends from a position Ymin of the boundary point KTmin to a position Ymax of the boundary point KTmax. The value of the position Ymin is the smallest value in the boundary point group of interest KTG. The value of the position Ymax is the largest value in the boundary point group of interest KTG. Stated differently, the boundary points KTmin and KTmax are boundary points KT at both ends of the boundary point group of interest KTG in the sub-scanning direction M2.

Figure 13:
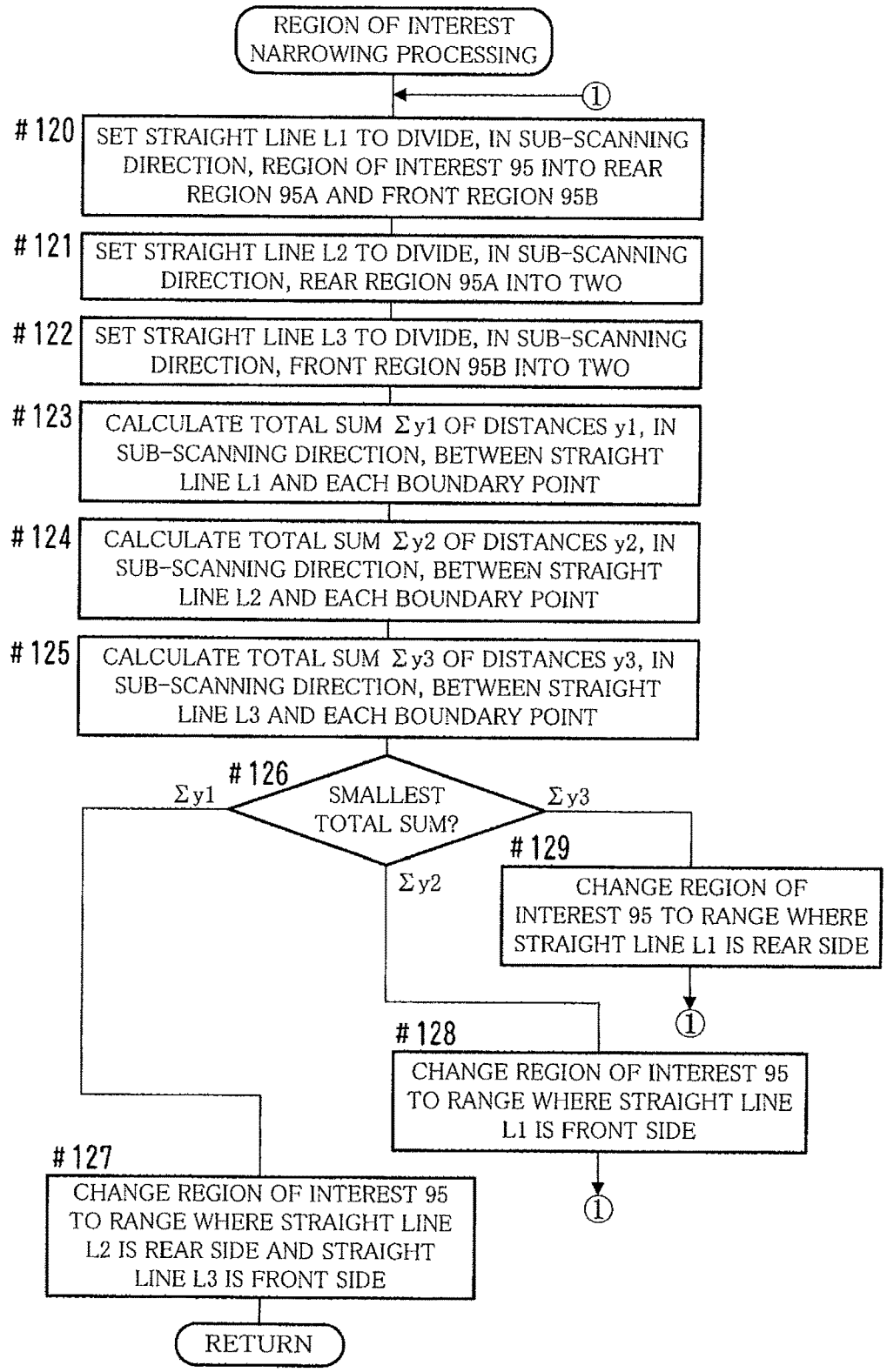
FIG. 13 is a flowchart for depicting an example of the flow of region of interest narrowing processing.
Figure 14A:
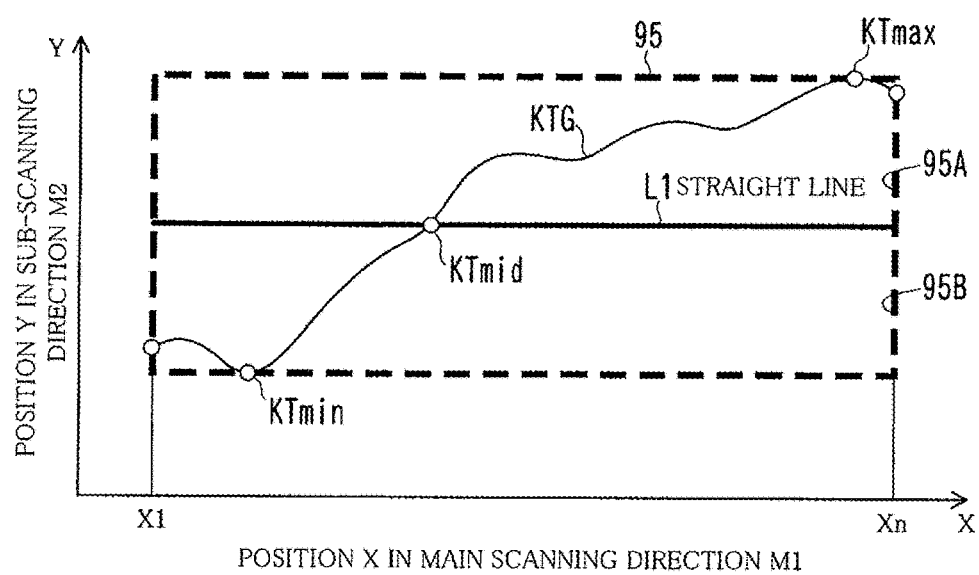
FIGS. 14A and 14B are diagrams showing an example of setting for straight line which narrows a region of interest.
Figure 14B:
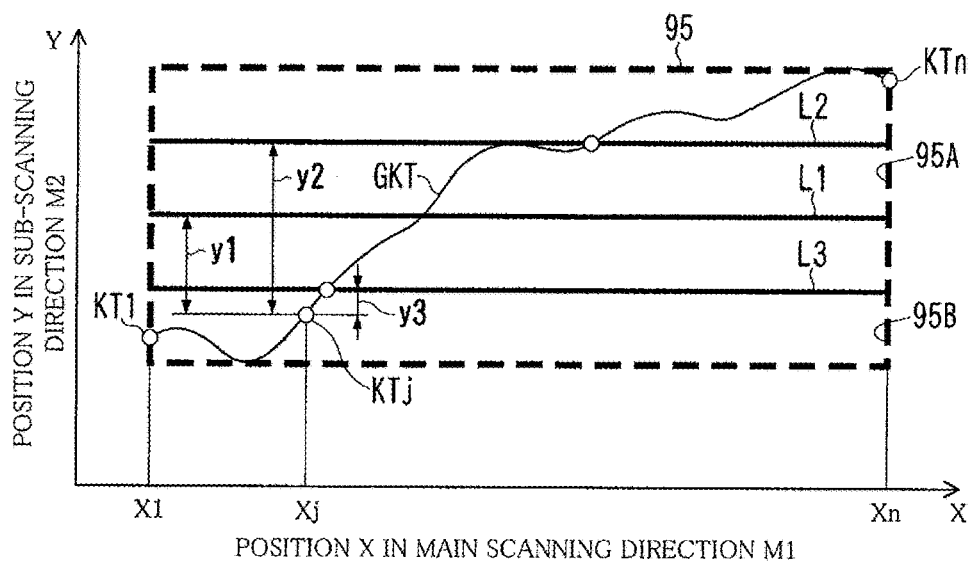
Figure 15A:
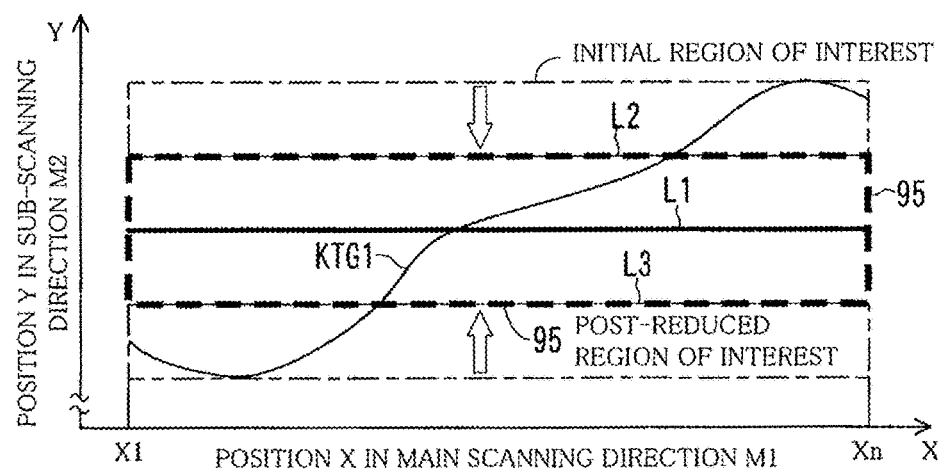
FIGS. 15A-15C are diagrams showing an example of boundary point group of interest corresponding to each state of a document, and an example of narrowing a region of interest depending on each state of the document.
Figure 15B:
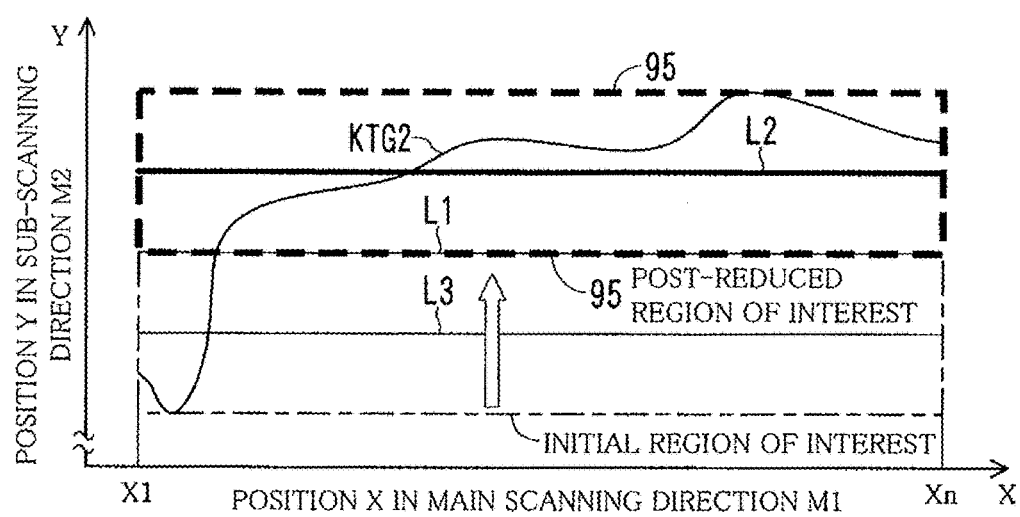
Figure 15C:
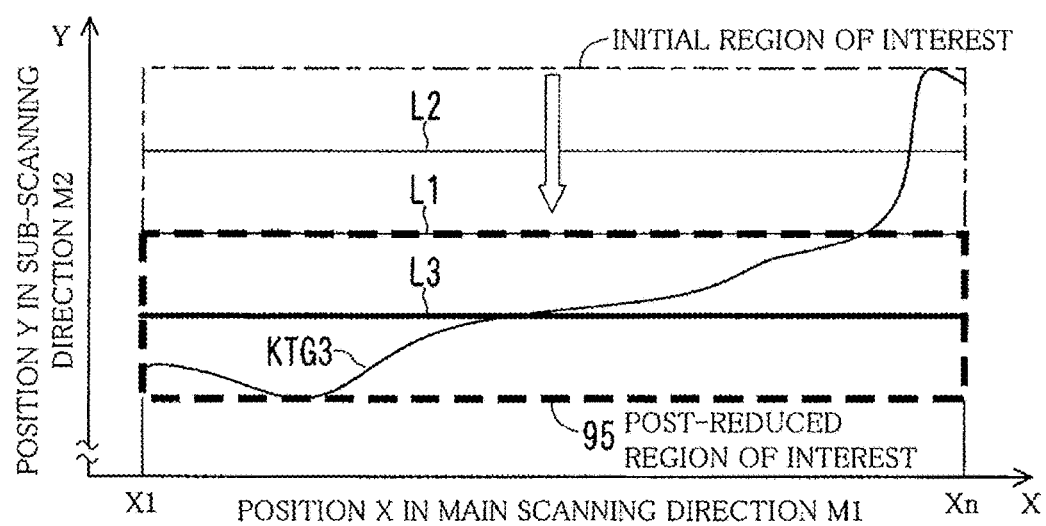

FIG. 13 depicts an example of the flow of region of interest narrowing processing corresponding to Step #12 of FIG. 10. FIGS. 14A and 14B show an example of setting for a straight line which narrows the region of interest 95. FIGS. 15A-15C show an example of boundary point groups of interest KTG1, KTG2, and KTG3 corresponding to each state of the document 8, and an example of narrowing the region of interest 95 depending thereon.

Referring to FIG. 13, the image processing apparatus 1 sets a straight line L1 to divide, in the sub-scanning direction M2, the region of interest 95 into a rear region 95A and a front region 95B (Step #120). Referring to FIG. 14A, the straight line L1 passes through a boundary point KTmid at or close to the center of the boundary point group of interest KTG in the sub-scanning direction M2. If the number of pixels, in the sub-scanning direction M2, of the region of interest 95 is an odd number, then the boundary point KT at the center of the boundary point group of interest KTG in the sub-scanning direction M2 is used as the boundary point KTmid. If the number of pixels, in the sub-scanning direction M2, of the region of interest 95 is an even number, then one of two boundary points KT closest to the center is used as the boundary point KTmid. In short, the straight line L1 divides the region of interest 95 in half or nearly in half in the sub-scanning direction M2.

Referring to FIG. 14A, the image processing apparatus 1 sets a straight line L2 to divide the rear region 95A in the sub-scanning direction M2, and a straight line L3 to divide the front region 95B in the sub-scanning direction M2 (Steps #121 and #122). As with the division by the straight line L1, the straight lines L2 and L3 divide the individual target regions in half or nearly in half. In short, the three straight lines L1, L2, and L3 divide the region of interest 951 in quarters or so.

Then, the image processing apparatus 1 calculates a total sum $\Sigma y1$ of distances y1, in the sub-scanning direction M2, between the straight line L1 and each of the boundary points KT of the boundary point group of interest KTG (Step #123). The image processing apparatus 1 calculates a total sum $\Sigma y2$ of distances y2, in the sub-scanning direction M2, between the straight line L2 and each of the boundary points KT of the boundary point group of interest KTG (Step #124). The image processing apparatus 1 calculates a total sum $\Sigma y3$ of distances y3, in the sub-scanning direction M2, between the straight line L3 and each of the boundary points KT of the boundary point group of interest KTG (Step #125). The image processing apparatus 1 then determines the smallest sum from among the total sums $\Sigma y1$, $\Sigma y2$, and $\Sigma y3$ (Step #126). The total sums $\Sigma y1$, $\Sigma y2$, and $\Sigma y3$ are examples of the parallel lines evaluation value EV3.

If the total sum $\Sigma y1$ for the straight line L1 is the smallest among the total sums $\Sigma y1$, $\Sigma y2$, and $\Sigma y3$, then the process goes to Step #127. In such a case, as shown in FIG. 15A, the region of interest 95 is so changed to be narrowed down to a central part in the sub-scanning direction M2. To be specific, the region of interest 95 is so reduced that the straight line L2 is used as a rear end (upper side in the drawing) and the straight line L3 is used as a front end (lower side in the drawing). The process then returns to the flow of FIG. 10.

If the total sum $\Sigma y2$ for the straight line L2 is the smallest among the total sums $\Sigma y1$, $\Sigma y2$, and $\Sigma y3$, then the process goes to Step #128. In such a case, as shown in FIG. 15B, the region of interest 95 is so changed to be narrowed down to the rear in the sub-scanning direction M2. To be specific, the region of interest 95 is so reduced that the straight line L1 is used as a front end (lower side in the drawing). The process then returns to Step #120 in which, as for the post-change region of interest 95, three new straight lines L1, L2, and L3 are set and evaluated in the same manner as discussed above.

If the total sum $\Sigma y3$ for the straight line L3 is the smallest among the total sums $\Sigma y1$, $\Sigma y2$, and $\Sigma y3$, then the process goes to Step #129. In such a case, as shown in FIG. 15C, the region of interest 95 is so changed to be narrowed down to the front in the sub-scanning direction M2. To be specific, the region of interest 95 is so reduced that the straight line L1 is used as a rear end (upper side in the drawing). The process then returns to Step #120. In such a case, three new straight lines L1, L2, and L3 are set and evaluated in the same manner as discussed above.

Stated differently, narrowing the region of interest 95 is repeated until the total sum $\Sigma y1$ for the straight line L1, which is the second line from one end of the three straight lines L1, L2, and L3, becomes the smallest among the total sums $\Sigma y1$, $\Sigma y2$, and $\Sigma y3$.

When the total sum Σy1 for the straight line L1 becomes the smallest among the total sums Σy1, Σy2, and Σy3, the position Y of the straight line L1 is used as the position Yc of the midpoint Pc in the sub-scanning direction M2.

Figure 17A:
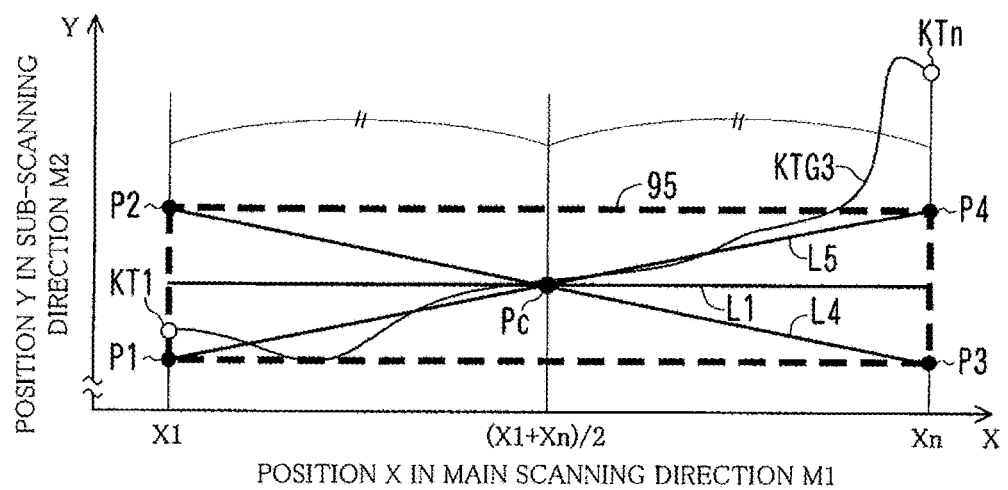
FIGS. 17A and 17B are diagrams showing an example of setting an oblique line.
Figure 17B:
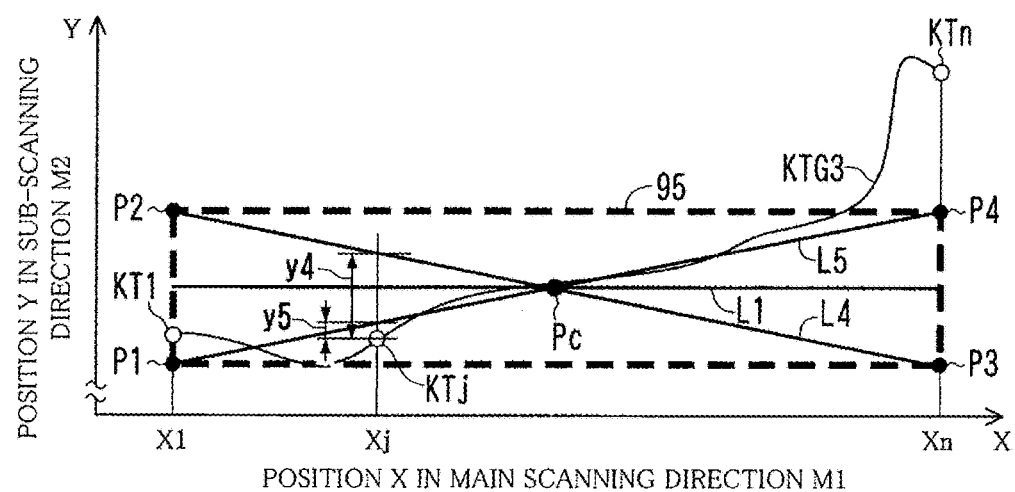

FIG. 16 depicts an example of the flow of skew direction determination processing corresponding to Step #13 of FIG. 10. FIGS. 17A and 17B show an example of setting oblique lines L4 and L5.

Referring to FIG. 16, the image processing apparatus 1 sets the center of the straight line L1 in the main scanning direction M1 at the midpoint Pc, and sets, as candidates for the oblique line La, two oblique lines L4 and L5 which pass through the midpoint Pc and slant to directions different from each other (Steps #130 and #131) as shown in FIG. 17A.

The oblique line L4 is a straight line slanting to the first direction resulting from the rotation of the straight line L1 in the clockwise direction. The oblique line L4 has at least one of an upper left vertex P2 and a lower right vertex P3 of the region of interest 95 shown in FIGS. 17A and 17B. Where the midpoint Pc completely matches the center of the region of interest 95, the oblique line L4 has both of the vertexes P2 and P3. In other words, the oblique line L4 has an amount of skew (angle formed by the oblique line L4 and the straight line L1) which is so limited that the oblique line L4 falls within the region of interest 95.

The oblique line L5 is a straight line slanting to the second direction resulting from the rotation of the straight line L1 in the counter clockwise direction. The oblique line L5 has at least one of a lower left vertex P1 and an upper right vertex P4 of the region of interest 95 shown in FIGS. 17A and 17B. As with the oblique line L4, an amount of skew of the oblique line L5 is limited.

The image processing apparatus 1 calculates a total sum Σy4 of distances y4, in the sub-scanning direction M2, between the oblique line L4 and each of the boundary points KT of the boundary point group of interest KTG (Step #132). The image processing apparatus 1 calculates a total sum Σy5 of distances y5, in the sub-scanning direction M2, between the oblique line L5 and each of the boundary points KT of the boundary point group of interest KTG (Step #133). The image processing apparatus 1 then compares between the total sums Σy4 and Σy5 (Step #134). The total sums Σy4 and Σy5 are examples of the parallel lines evaluation value EV4.

If the total sum Σy4 for the oblique line L4 is smaller than the total sum Σy5 for the oblique line L5, then the image processing apparatus 1 performs processing for determining an amount of skew in the first direction (Step #135). The processing returns to the flow of FIG. 10. Conversely, if the total sum Σy5 for the oblique line L5 is smaller than the total sum Σy4 for the oblique line L4, then the image processing apparatus 1 performs processing for determining an amount of skew in the second direction (Step #136). The processing returns to the flow of FIG. 10.

Figure 18:
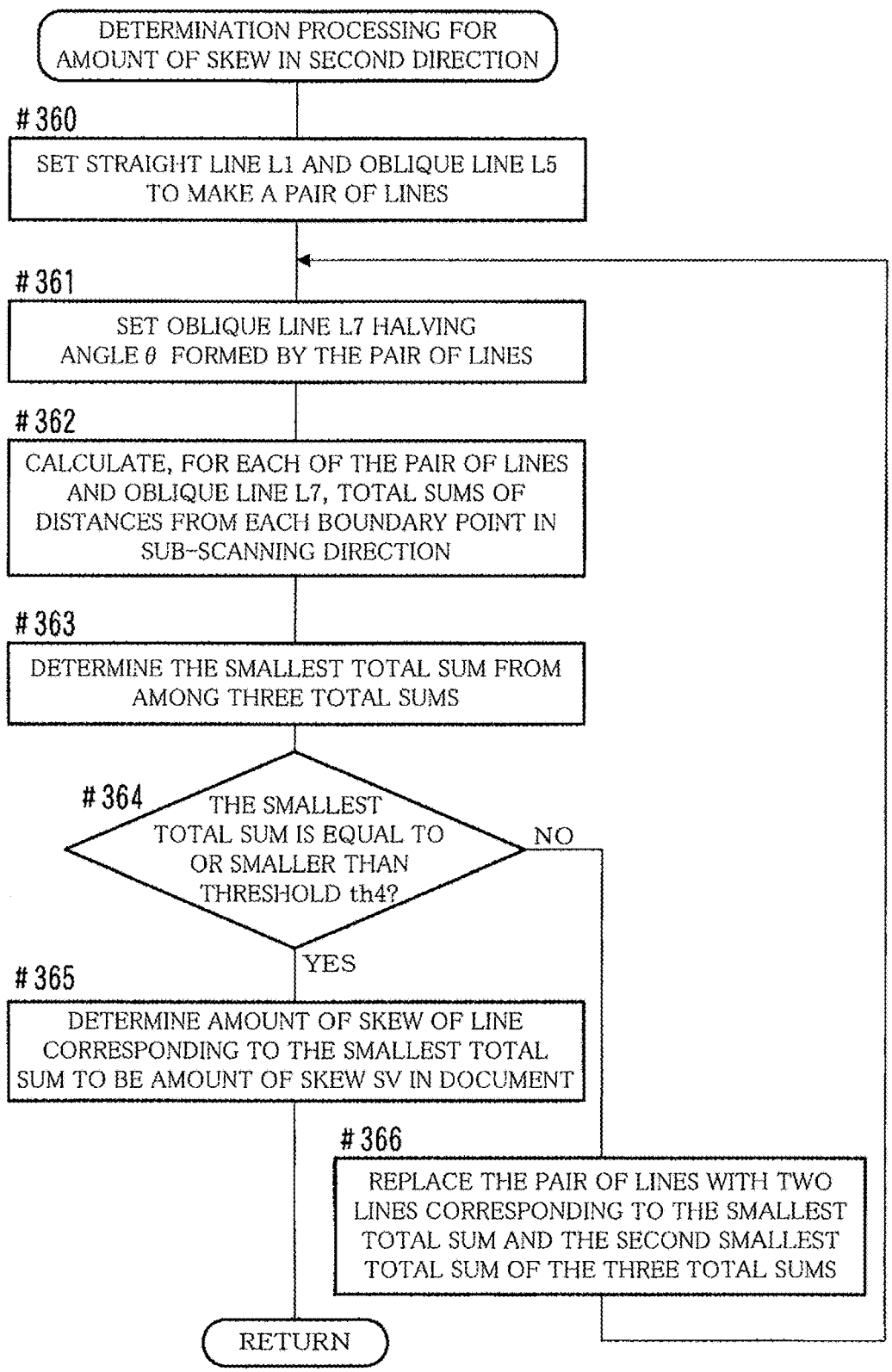
FIG. 18 is a flowchart for depicting an example of the flow of processing for determining an amount of skew in a second direction.
Figure 19A:
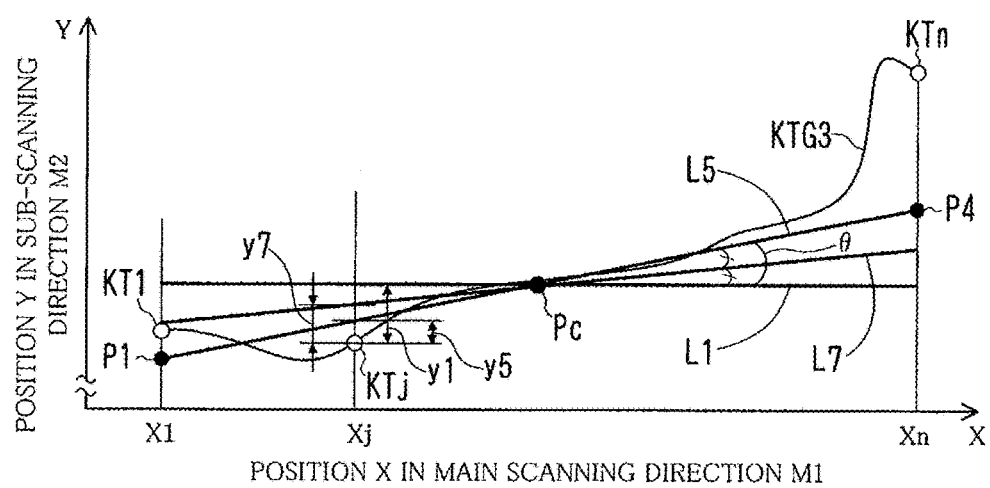
FIGS. 19A and 19B are diagrams showing an example of narrowing an amount of skew of an oblique line.
Figure 19B:
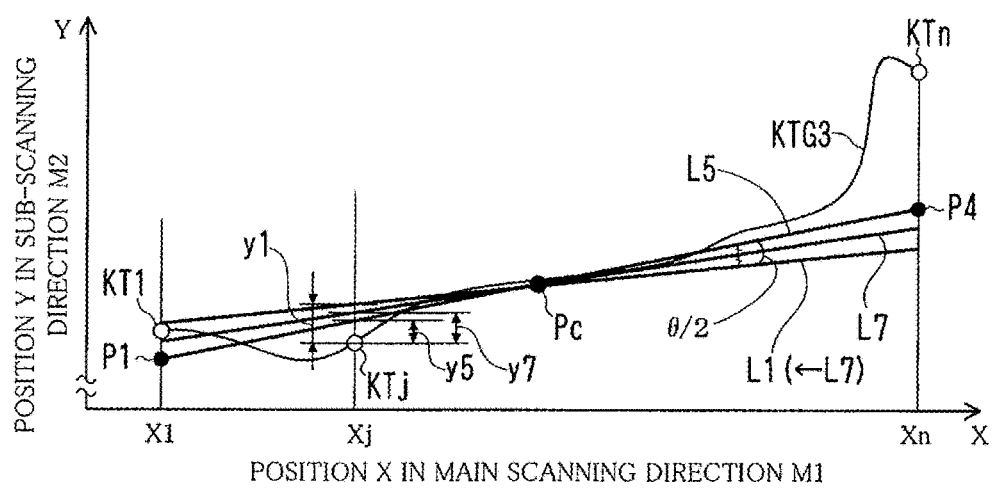

FIG. 18 depicts an example of the flow of processing for determining an amount of skew in the second direction. FIGS. 19A and 19B show an example of narrowing an amount of skew SV of an oblique line La.

The processing for determining an amount of skew in the second direction includes using the oblique line L5 as the oblique line La, narrowing down the amount of skew of the oblique line La to determine an amount of skew SV in the document 8 as described below.

The straight line L1 and the oblique line L5 are set to make a pair of lines (Step #360). As shown in FIG. 19A, an oblique line L7 is set which halves an angle θ formed by the pair of lines (Step #361). The division is preferably to halve the angle θ or divide the angle θ in nearly halves.

With respect to each of the pair of lines and the oblique line L7, the image processing apparatus 1 calculates (Step #362) total sums Σy1, Σy5, and Σy7 of distances y1, y5, and y7, in the sub-scanning direction M2, from all of the boundary points KT of the boundary point group of interest KTG. As to the total sums Σy1 and Σy5, the result of previous calculation may be used to omit the calculation of the total sums Σy1 and Σy5 in Step #362.

The image processing apparatus 1 determines which of the three total sums Σy1, Σy5, and Σy7 has the smallest value (Step #363). The image processing apparatus 1 then determines whether or not the smallest total sum is equal to or smaller than the threshold th4 (Step #364).

If the smallest total sum is equal to or smaller than the threshold th4 (YES in Step #364), then the image processing apparatus 1 determines the amount of skew SV of a line corresponding to the smallest total sum (oblique line 115, oblique line L7, or straight line L1) to be the amount of skew SV in the document 8 (Step #365).

If the smallest total sum is not equal to or smaller than the threshold th4 (NO in Step #364), then the image processing apparatus 1 continues to narrow down the amount of skew. To be specific, the image processing apparatus 1 performs "line replacement" of selecting, from among the three total sums Σy1, Σy5, and Σy7, the smallest total sum and the second smallest total sum, and of making a pair of two lines corresponding to the selected total sums (Step #366). The flow goes back to Step #361 in which an angle formed by the post-replacement lines is halved, and the processing beyond Step #361 is performed once again.

Where the total sums Σy5 and Σy7 corresponding to the oblique line L5 and L7 are smaller than the total sum Σy1 for the straight line L1 as shown in FIG. 19A, the line replacement is made to handle the original oblique line Lt7 as the straight line L1 making the pair of lines, and a new oblique line Lt7 is set which halves an angle (θ/2) formed by the straight line L1 and the oblique line L5 as shown in FIG. 19B.

Where the total sums Σy1 and Σy7 corresponding to the original straight line L1 and the original oblique line L7 are smaller than the total sum Σy5 for the oblique line L5, the line replacement is made to handle the original oblique line Lt7 as the oblique line L5 making the pair of lines.

FIG. 20 depicts an example of the flow of processing for determining an amount of skew in the first direction. The determination processing of an amount of skew in the first direction is to set the oblique line L4 as the oblique line La, narrow an amount of skew of the oblique line La to determine the amount of skew SV in the document 8. The basic flow of the determination processing of the amount of skew in the first direction is the same as that for the second direction.

To be specific, the straight line L1 and the oblique line L4 are set to make a pair of lines (Step #350). An oblique line L6 is set which halves an angle θ formed by the pair of lines (Step #351).

With respect to each of the pair of lines and the oblique line L6, the image processing apparatus 1 calculates (Step #352) total sums Σy1, Σy4, and Σy6 of distances y1, y4, and y6, in the sub-scanning direction M2, from all of the boundary points KT of the boundary point group of interest KTG. The total sums Σy4 and Σy6 are examples of the parallel lines evaluation value EV4.

The image processing apparatus 1 determines which of the three total sums Σy1, Σy4, and Σy6 has the smallest value (Step #353). The image processing apparatus 1 then determines whether or not the smallest total sum is equal to or smaller than the threshold th4 (Step #354).

If the smallest total sum is equal to or smaller than the threshold th4 (YES in Step #353), then the image processing apparatus 1 determines the amount of skew SV of a line corresponding to the smallest total sum (oblique line L4, oblique line L6, or straight line L1) to be the amount of skew SV in the document 8 (Step #354).

If the smallest total sum is not equal to or smaller than the threshold th4 (NO in Step #353), then the processing returns to Step #351 in which the image processing apparatus 1 continues to perform processing for narrowing down the amount of skew.

According to the foregoing embodiment, the amount of skew SV in the document 8 can be detected without the use of complicated arithmetic processing such as calculation of an approximated line by Hough transform or method of least squares. The following processing is easily implemented by hardware: detecting a boundary point KT by comparison between the threshold th3 and a gradation value of a pixel; setting the boundary point group of interest KTG; narrowing the region of interest 95 for determination of a midpoint Pc of an oblique line La; setting an oblique line La; narrowing down an amount of skew of an oblique line La; and determining an amount of skew SV in the document 8 based on the result of narrowing. Stated differently, the foregoing processing is implemented by the use of hardware, so that the amount of skew SV can be detected at a speed higher than that for implementation of the processing only by the use of software. Speeding up of detection, namely, improving responsiveness to a detection trigger is important, especially in the case of reading images in documents 8 one after another by using the automatic document feeder 10. Prompt detection of the amount of skew SV leads to prompt execution of a skew correction to the input image G10 read from each of the documents 8.

According to the embodiment discussed above, an amount of skew SV in a document can be detected at precision independently of the document in a time shorter than is conventionally possible.

In the foregoing embodiment, the amount of skew SV is detected by using an image including the shadow 9 corresponding to the leading end 8a of the document 8. Thus, the amount of skew SV can be detected at an early stage of reading the document 8, which enables various processing using the amount of skew SV to be performed at an early time.

Where the amount of skew SV in the document 8 placed on the platen glass 21 is detected without using the automatic document feeder 10, a shadow 9 may be used which is made in a trailing end of the document 8 at a time when the light source unit 22 moves to approach the trailing end of the document 8.

In such a case, for example, the boundary point detection portion 301 checks gradation values MD of pixels in the input image G10 in order from the trailing end of the input image G10. Then, the boundary point detection portion 301 preferably determines that the position Y, in the sub-scanning direction M2, of a pixel which has a gradation value MD equal to or smaller than the threshold th3 and first appears is the boundary point KT. The position at which the shadow 9 is made changes depending on where the light source 24 is disposed. Therefore, a boundary point KT is detected accordingly so that a amount of skew SV is detected. For example, when the document 8 is irradiated from the front of the light source unit 22 in its movement direction, a shadow 9 made in the leading end of the document 8 may be used to detect an amount of skew SV, as with the foregoing detection of the amount of skew SV for the case of conveying the document 8.

The image processing apparatus 1 is not limited to an MFP. The image processing apparatus 1 may be any device which is configured to read an image recorded in the document 8. The image processing apparatus 1 may be a copier, a facsimile machine, or an image reader. The automatic document feeder 10 may be provided with an image sensor for reading an image recorded in the document 8.

It is to be understood that the configuration of the image processing apparatus 1, the constituent elements thereof, the content, order, and time of the processing, the method for detecting the boundary point KT, the method for determining an amount of skew SV in the document 8, and the like can be appropriately modified without departing from the spirit of the present invention.

Although the present invention has been described and illustrated in detail, it is clearly understood that the present invention is by way of illustrated and example only and is not to be taken by way of limitation, the scope of the present invention being interpreted by terms of the appended claims.

What is claimed is:

1. A device for detecting an amount of skew in a sheet-like document, the document being placed on a surface of a background plate or passing over the surface of the background plate, the device comprising:
    a light source configured to apply light to the document;
    a scan portion configured to scan an area including at least one edge of the document with light, by the light source, reflected from the document to obtain an input image;
    a boundary point detector configured to detect, for each position in a main scanning direction, a boundary point between the document and the background plate in the input image;
    a boundary point group of interest setting portion configured to set a boundary point group of interest from among the boundary points detected, the boundary point group of interest including two boundary points spaced away from each other in the main scanning direction and boundary points located between the two boundary points;
    an oblique line setting portion configured to set a line which slants to the main scanning direction based on positions of the boundary point group of interest in the main scanning direction and in a sub-scanning direction;
    a skew modifying portion configured to modify an amount of skew of the oblique line so that an error between the boundary point group of interest and the oblique line is reduced; and
    an amount of skew determination portion configured to determine that an amount of skew in the document is an amount of skew of the oblique line having the error equal to or smaller than a threshold.

2. The device according to claim 1; wherein
    the skew modifying portion includes
        an oblique line evaluation portion configured to calculate an oblique line evaluation value indicating the error, and
        an oblique line resetting portion configured to repeat, until the calculated oblique line evaluation value reaches the threshold or smaller, resetting of the oblique line to replace the oblique line with a line resulting from rotation of the oblique line with respect to the midpoint in such a manner that an amount of skew of the oblique line is gradually reduced for every resetting, and configured to cause, for every resetting of the oblique line, the oblique line evaluation portion to calculate the oblique line evaluation value.

3. The device according to claim 2; wherein the oblique line evaluation portion calculates, as the oblique line evaluation value, a total sum of distances in the sub-scanning direction between the oblique line and the individual boundary points of the boundary point group of interest.

4. The device according to claim 1; wherein
the midpoint setting portion includes
a parallel lines evaluation portion configured to calculate, for each of straight lines that pass through boundary points except boundary points serving as both ends of the boundary point group of interest in the sub-scanning direction and are parallel to the main scanning direction, a parallel lines evaluation value indicating an error from the boundary point group of interest, and
a midpoint position setting portion configured to set a position in the sub-scanning direction of a straight line having a smallest parallel lines evaluation value calculated among the straight lines at a position of the midpoint in the sub-scanning direction.

5. The device according to claim 4; wherein the parallel lines evaluation portion calculates, as the parallel lines evaluation value, a total sum of distances, in the sub-scanning direction at positions in the main scanning direction, between each of the straight lines and each of boundary points of the boundary point group of interest.

6. The device according to claim 4; wherein
the midpoint setting portion further includes
a parallel lines setting portion configured to set, as the straight lines parallel to the main scanning direction, three straight lines for dividing, in four, a distance between both ends of the boundary point group of interest in the sub-scanning direction, and
a parallel lines resetting portion configured to repeat, until the parallel lines evaluation value of a center line of the three straight lines becomes smallest, resetting of the three straight lines in such a manner that a straight line having the smallest parallel lines evaluation value becomes the center line, and configured to cause, for every resetting of the three straight lines, the parallel lines evaluation portion to calculate the parallel lines evaluation values.

7. The device according to claim 1; wherein
the background plate is white or glossy, and
the boundary point detector detects, as the boundary point, among pixels of the input image, a pixel which is present in a vicinity of the sub-scanning direction with respect to the background plate; has a gradation value of brightness information equal to or smaller than a first threshold; and has a difference, from the gradation value of the brightness information on the background plate, equal to or greater than a second threshold.

8. The device according to claim 1; wherein the boundary point detector excludes, from a result of detection, among the boundary points detected, a boundary point having a distance in the sub-scanning direction from an adjacent boundary point in the main scanning direction equal to or greater than a threshold.

9. The device according to claim 1; wherein the oblique line setting portion determines whether the oblique line slants to a first direction or a second direction which is opposite to the first direction based on positions in the main scanning direction of two boundary points which serve as both ends of the boundary point group of interest in the sub-scanning direction.

10. The device according to claim 1; wherein the boundary point detector changes a pitch in the main scanning direction between the positions at which the boundary points are detected in accordance with a size of the document in the main scanning direction.

11. An image processing apparatus comprising:
a light source configured to apply light to a sheet-like document, the document being placed on a surface of a background plate or passing over the surface of the background plate;
a scan portion configured to scan an area including at least one edge of the document with light, by the light source, reflected from the document to obtain an input image;
a boundary point detector configured to detect, for each position in a main scanning direction, a boundary point between the document and the background plate in the input image;
a boundary point group of interest setting portion configured to set a boundary point group of interest from among the boundary points detected, the boundary point group of interest including two boundary points spaced away from each other in the main scanning direction and boundary points located between the two boundary points;
an oblique line setting portion configured to set a line which slants to the main scanning direction based on positions of the boundary point group of interest in the main scanning direction and in a sub-scanning direction;
a skew modifying portion configured to modify an amount of skew of the oblique line so that an error between the boundary point group of interest and the oblique line is reduced;
an amount of skew determination portion configured to determine that an amount of skew in the document is an amount of skew of the oblique line having the error equal to or smaller than a threshold; and
a skew correction portion configured to apply, to the input image, correction processing in accordance with an amount of skew in the document determined by the amount of skew determination portion.

12. The image processing apparatus according to claim 11; wherein
the skew modifying portion includes
an oblique line evaluation portion configured to calculate an oblique line evaluation value indicating the error, and
an oblique line resetting portion configured to repeat, until the calculated oblique line evaluation value reaches the threshold or smaller, resetting of the oblique line to replace the oblique line with a line resulting from rotation of the oblique line with respect to the midpoint in such a manner that an amount of skew of the oblique line is gradually reduced for every resetting, and configured to cause, for every resetting of the oblique line, the oblique line evaluation portion to calculate the oblique line evaluation value.

13. The image processing apparatus according to claim 12; wherein the oblique line evaluation portion calculates, as the oblique line evaluation value, a total sum of distances in the sub-scanning direction between the oblique line and the individual boundary points of the boundary point group of interest.

14. The image processing apparatus according to claim 11; wherein
the midpoint setting portion includes
a parallel lines evaluation portion configured to calculate, for each of straight lines that pass through positions except boundary points serving as both ends of the boundary point group of interest in the sub-scanning direction and are parallel to the main scanning direction, a parallel lines evaluation value indicating an error from the boundary point group of interest, and
a midpoint position setting portion configured to set a position in the sub-scanning direction of a straight line having a smallest parallel lines evaluation value calculated among the straight lines at a position of the midpoint in the sub-scanning direction.

15. The image processing apparatus according to claim 14; wherein the parallel lines evaluation portion calculates, as the parallel lines evaluation value, a total sum of distances, in the sub-scanning direction at positions in the main scanning direction, between each of the straight lines and each of boundary points of the boundary point group of interest.

16. The image processing apparatus according to claim 14; wherein
the midpoint setting portion further includes
a parallel lines setting portion configured to set, as the straight lines parallel to the main scanning direction, three straight lines for dividing, in four, a distance between both ends of the boundary point group of interest in the sub-scanning direction, and
a parallel lines resetting portion configured to repeat, until the parallel lines evaluation value of a center line of the three straight lines becomes smallest, resetting of the three straight lines in such a manner that a straight line having the smallest parallel lines evaluation value becomes the center line, and configured to cause, for every resetting of the three straight lines, the parallel lines evaluation portion to calculate the parallel lines evaluation values.

17. The image processing apparatus according to claim 11; wherein
the background plate is white or glossy, and
the boundary point detector detects, as the boundary point, among pixels of the input image, a pixel which is present in a vicinity of the sub-scanning direction with respect to the background plate; has a gradation value of brightness information equal to or smaller than a first threshold; and has a difference, from the gradation value of the brightness information on the background plate, equal to or greater than a second threshold.

18. The image processing apparatus according to claim 11; wherein the boundary point detector excludes, from a result of detection, among the boundary points detected, a boundary point having a distance in the sub-scanning direction from an adjacent boundary point in the main scanning direction equal to or greater than a threshold.

19. The image processing apparatus according to claim 11; wherein the oblique line setting portion determines whether the oblique line slants to a first direction or a second direction which is opposite to the first direction based on positions in the main scanning direction of two boundary points which serve as both ends of the boundary point group of interest in the sub-scanning direction.

20. The image processing apparatus according to claim 11; wherein the boundary point detector changes a pitch in the main scanning direction between the positions at which the boundary points are detected in accordance with a size of the document in the main scanning direction.

* * * * *